(12) United States Patent
McDonald et al.

(10) Patent No.: US 9,403,437 B1
(45) Date of Patent: *Aug. 2, 2016

(54) DRIVER REMINDER SYSTEMS

(71) Applicants: Scott D. McDonald, Phoenix, AZ (US);
Stuart D. McDonald, Phoenix, AZ (US)

(72) Inventors: Scott D. McDonald, Phoenix, AZ (US);
Stuart D. McDonald, Phoenix, AZ (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/975,070

(22) Filed: Aug. 23, 2013

Related U.S. Application Data

(63) Continuation-in-part of application No. 12/837,456, filed on Jul. 15, 2010, now abandoned.

(60) Provisional application No. 61/226,207, filed on Jul. 16, 2009, provisional application No. 61/245,636, filed on Sep. 24, 2009, provisional application No. 61/773,939, filed on Mar. 7, 2013, provisional application No. 61/757,516, filed on Jan. 28, 2013.

(51) Int. Cl.
| | | |
|---|---|---|
| *B60K 37/02* | (2006.01) | |
| *B60N 2/00* | (2006.01) | |
| *B60N 2/28* | (2006.01) | |
| *B60N 2/26* | (2006.01) | |
| *B60Q 1/00* | (2006.01) | |

(52) U.S. Cl.
CPC ..................... *B60K 37/02* (2013.01)

(58) Field of Classification Search
CPC ............ B60N 2/002; B60N 2/28; B60N 2/26; B60N 2/2812; G08B 21/24; G08B 21/22; G08B 21/0202
USPC ................................................ 340/438, 457
See application file for complete search history.

(56) References Cited

U.S. PATENT DOCUMENTS

| | | | |
|---|---|---|---|
| 4,137,985 A | 2/1979 | Winchell | |
| 4,673,195 A | 6/1987 | Boyd et al. | |
| 4,967,883 A | 11/1990 | Kito et al. | |
| 5,551,266 A | 9/1996 | Behrens | |
| 5,670,831 A * | 9/1997 | Georgiades | B60R 25/04 180/287 |
| 6,104,293 A | 8/2000 | Rossi | |
| 6,230,530 B1 | 5/2001 | Voigt et al. | |
| 6,353,394 B1 * | 3/2002 | Maeda | B60N 2/002 177/144 |
| 6,437,459 B1 | 8/2002 | Politi | |
| 6,922,147 B1 | 7/2005 | Viksnins et al. | |
| 6,924,742 B2 | 8/2005 | Mesina | |
| 6,998,988 B1 | 2/2006 | Kalce | |
| 7,012,533 B2 | 3/2006 | Younse | |
| 7,123,157 B2 | 10/2006 | Best | |
| 7,170,401 B1 | 1/2007 | Cole | |
| 7,188,898 B2 | 3/2007 | Patterson et al. | |
| 7,218,211 B2 | 5/2007 | Ho et al. | |
| 7,304,256 B2 | 12/2007 | Kawahira et al. | |
| 7,348,880 B2 | 3/2008 | Hules et al. | |
| 7,348,889 B2 | 3/2008 | Monzo et al. | |
| 7,378,979 B2 | 5/2008 | Rams, Jr. | |
| 7,422,277 B2 | 9/2008 | Chen | |
| 7,439,866 B2 | 10/2008 | Wallner et al. | |
| 7,584,667 B2 | 9/2009 | Lichtinger et al. | |
| 7,663,493 B2 | 2/2010 | Monzo et al. | |
| 7,714,737 B1 | 5/2010 | Morningstar | |

(Continued)

*Primary Examiner* — Jack K Wang
(74) *Attorney, Agent, or Firm* — Lodestar Patents, PLLC; Raymond J. E. Hall

(57) ABSTRACT

A driver reminder system to remind at least the driver of a vehicle, prior to leaving such vehicle, that there is at least one other occupant in the vehicle. The system couples to aftermarket and OEM vehicle alarm systems to provide vehicle alerting of a child left in the vehicle.

24 Claims, 13 Drawing Sheets

(56) References Cited

U.S. PATENT DOCUMENTS

| | | | |
|---|---|---|---|
| 8,063,788 B1* | 11/2011 | Morningstar | B60N 2/002 180/271 |
| 8,892,302 B1* | 11/2014 | McDonald | G08B 21/24 701/36 |
| 2003/0132838 A1* | 7/2003 | Toles | B60N 2/0244 340/457 |
| 2004/0068354 A1 | 4/2004 | Tabe | |
| 2005/0012593 A1 | 1/2005 | Harrod et al. | |
| 2006/0273917 A1* | 12/2006 | Rams, Jr. | B60N 2/002 340/667 |
| 2007/0057780 A1 | 3/2007 | Bridges et al. | |
| 2007/0268119 A1 | 11/2007 | Cram | |
| 2008/0028807 A1 | 2/2008 | Frohne et al. | |
| 2009/0027188 A1 | 1/2009 | Saban | |
| 2009/0079557 A1* | 3/2009 | Miner | B60N 2/002 340/457.1 |
| 2010/0107709 A1 | 5/2010 | Chung | |

\* cited by examiner

DRIVER REMINDER SYSTEMS

CROSS-REFERENCE TO RELATED APPLICATIONS

The present application is a continuation-in-part of, and is related to and claims priority from, application Ser. No. 12/837,456, filed Jul. 15, 2010, entitled "DRIVER REMINDER SYSTEMS", which prior application is related to and claims priority from prior provisional application Ser. No. 61/226,207, filed Jul. 16, 2009, entitled "DRIVER REMINDER SYSTEMS"; and, which prior application is related to and claims priority from prior provisional application Ser. No. 61/245,636, filed Sep. 24, 2009, entitled "DRIVER REMINDER SYSTEMS"; and, this application is related to and claims priority from prior provisional application Ser. No. 61/773,939, filed Mar. 7, 2013, entitled "DRIVER REMINDER SYSTEMS"; and, this application is related to and claims priority from prior provisional application Ser. No. 61/757,516, filed Jan. 28, 2013, entitled "CHILD REMINDER SYSTEMS, the contents of all of the above are incorporated herein by this reference and are not admitted to be prior art with respect to the present invention by the mention in this cross-reference section.

BACKGROUND

This invention relates to providing an occupant reminder system to remind at least one occupant of a vehicle, prior to leaving such vehicle, that there is at least one other occupant in the vehicle (such as a child or pet). More particularly, this invention relates to providing a system relating to reminding a driver not to leave a child in the vehicle.

In our fast and busy society, there are often constant demands on our time and people can experience great stress. One consequence of this stress can result in one being forgetful. Every year, children die from heat stroke, cold, or other elements after being unintentionally left in vehicles. A means for reminding the operator of a vehicle of the presences of a child or other occupant would be of great benefit to many. Additionally, a means to alert those in the area adjacent a vehicle with an occupant unintentionally left in such vehicle would be useful and possibly save injury or death to such occupant.

OBJECTS AND FEATURES OF THE INVENTION

A primary object and feature of the present invention is to provide a system overcoming the above-mentioned problem(s). It is a further object and feature of the present invention to provide such a system that assists reminding a driver, prior to leaving or exiting a vehicle, that there is a child in the vehicle.

It is a further object and feature of the present invention to provide such a system that once installed, will provide audio and visual warnings to the driver, thereby acting as a reminder to the driver, or other responsible adult, of an occupant still within the vehicle. A further primary object and feature of the present invention is to provide such a system that can be retrofitted to existing vehicles or installed by an original equipment manufacturer.

Another primary object and feature of the present invention is to provide such a system that can be retrofitted or installed into present day vehicles with minimal impact on current shift-interlock systems. Another object and feature of the present invention is to provide such a system that provides a special child seat incorporating a built-in sensor to identify the presence of an infant or child within a vehicle. A further object and feature of the present invention is to provide such a system that includes vehicles equipped with a driver reminder system and means for interfacing the driver reminder system with a built-in sensor on a child seat.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to reminding at least one driver of a motor vehicle that there is at least one child occupant in the motor vehicle when the ignition of such motor vehicle is inactivated and a child is present in the motor vehicle, comprising: at least one child-present sensor structured and arranged to sense the presence of at least one child in the motor vehicle; at least one vehicle ignition sensor structured and arranged to sense activation or deactivation of the motor vehicle ignition; at least one motor vehicle-alert structured and arranged to alert at least one motor vehicle area adjacent the child occupant; and at least one alarm processor structured and arranged to receive signals from such at least one child-present sensor, receive signals from such at least one motor vehicle ignition sensor, and send at least one alert signal to such at least one motor vehicle-alert; wherein such system may alert the at least one driver of a motor vehicle that there is at least one child occupant in the motor vehicle when the ignition of such motor vehicle is inactivated and at least one child is present in the motor vehicle. Moreover, it provides such a system further comprising at least one timer structured and arranged to provide at least one timed alert when the ignition of such motor vehicle is inactivated and a child is present in the motor vehicle.

Additionally, it provides such a system wherein such at least one timer comprises: at least one first timer structured and arranged to provide an initial timed alert immediately upon at least one child-present sensor sensing the presence of a child in the motor vehicle and such at least one vehicle ignition sensor sensing deactivation of the motor vehicle ignition; and at least one second timer structured and arranged to provide at least one second timed alert after a pre-determined time wherein such at least one child-present sensor continues to sense the presence of a child in the motor vehicle and such at least one vehicle ignition sensor continues to sense deactivation of the motor vehicle ignition. Also, it provides such a system wherein such at least one first timer provides an initial timed alert of from about 5 seconds to about 30 seconds. In addition, it provides such a system wherein such at least one second timer provides at least one second timed alert after a pre-determined time of between about 5 minutes and about 10 minutes. And, it provides such a system further comprising at least one aftermarket motor vehicle alarm structured and arranged to be installed into at least one motor vehicle.

Further, it provides such a system wherein such at least one aftermarket motor-vehicle alarm is structured and arranged to receive such at least one alert signal from such at least one alarm processor when installed in the at least one motor vehicle. Even further, it provides such a system wherein such at least one motor-vehicle alert comprises at least one motor-vehicle horn blast. Moreover, it provides such a system wherein such at least one child-present sensor comprises at least one pressure-sensitive sensor structured and arranged to activate upon weight-bearing pressure of the at least one child. Additionally, it provides such a system wherein such at least one pressure-sensitive sensor comprises at least one pad structured and arranged to be placed under the at least one child occupant.

In accordance with another preferred embodiment hereof, this invention provides a system, relating to reminding at least a driver of a motor vehicle that there is at least one second occupant in the motor vehicle, comprising: at least one occupant detector structured and arranged to detect the presence of at least one second occupant within the motor vehicle; and at least one processor structured and arranged to receive at least one signal from such at least one occupant detector; and receive at least one engine ignition on/off signal; and at least one alert generator structured and arranged to generate at least one alert when received by such at least one processor; wherein at least the driver of a motor vehicle may be reminded of the presence of the at least one second occupant in the vehicle within a specified time. Also, it provides such a system wherein such at least one alert generator comprises at least one alert generating signal to at least one installed vehicle alarm. In addition, it provides such a system further comprising at least one override releaser structured and arranged to override such at least one alert generator. And, it provides such a system wherein: such at least one override releaser is structured and arranged to require at least one driver manual-action to operate such at least one override releaser; and such at least one driver manual-action comprises at least one purposeful manual action of the driver.

Further, it provides such a system wherein such at least one override releaser comprises at least one switch structured and arranged to de-activate such at least one alert generator. Even further, it provides such a system further comprising: at least one child safety seat structured and arranged to support the at least one second occupant within the motor vehicle; wherein such at least one child safety seat comprises at least one sensor structured and arranged to provide at least one sensor output signal when a child is present in such at least one child safety seat.

In accordance with another preferred embodiment hereof, this invention provides a system, relating to reminding at least one driver of a motor vehicle that there is at least one child occupant in the motor vehicle, comprising: at least one child-present sensor structured and arranged to sense the presence of a child in the motor vehicle; at least one vehicle ignition-electrical state on/off processor structured and arranged to determine if the vehicle electrical is on or off; wherein such at least one child sensor comprises at least one child sensor signaler structured and arranged to send at least child present and child not present signals; wherein such at least one vehicle ignition-electrical state on/off sensor comprises at least one electrical sensor signaler structured and arranged to signal at least ignition-electrical state present and ignition-electrical state not present signals; at least one processor structured and arranged to process such child sensor signal and such ignition-electrical state sensor signal; wherein such at least one processor comprises at least one communicator structured and arranged to communicate with at least one vehicle installable alarm apparatus; whereby when such child present sensor means senses the presence of a child in the motor vehicle and when such first processor means determines that vehicle ignition-electrical state is in an off state, an alert signal is communicated to at least one installed vehicle alarm apparatus to emit at least one alarm to reminding at least one driver of a motor vehicle that there is at least one child occupant in the motor vehicle.

In accordance with another preferred embodiment hereof, this invention provides a method, relating to preventing abandonment of at least one passenger occupant in at least one child seat, within a cabin of a motor vehicle, after operation of the motor vehicle has ceased, such method comprising the steps of: providing at least one first sensor to sense the presence of the at least one passenger occupant in the at least one child seat, wherein such at least one first sensor provides at least one occupant-present signal signaling the presence of the at least one passenger occupant in the at least one child seat; accessing at least one vehicle-status signal signaling that the operation of the motor vehicle has ceased; providing at least one alert actuator to actuate at least one perceptible alert alerting at least one individual to a possible abandonment of the at least one passenger occupant in the at least one child seat of the motor vehicle; and providing within such at least one alert actuator at least one interval timer structured and arranged to time at least one selected time interval having an interval start and an interval end; wherein such at least one alert actuator is structured and arranged to initiate the interval start of the at least one selected time interval when such at least one occupant-present signal signals the presence of the at least one passenger occupant in the at least one child seat and such at least one vehicle-status signal signals that the operation of the motor vehicle has ceased, and initiate the actuation of the at least one perceptible alert if, on reaching the interval end, such at least one occupant-present signal continues to signal the presence of the at least one passenger occupant within such at least one child seat and such at least one vehicle-status signal continues to signal that the operation of the motor vehicle remains ceased.

Even further, it provides such a method further comprising the steps of: providing at least one portable child safety seat to support the at least one passenger occupant within the cabin of the motor vehicle; and integrating such at least one first sensor within such at least one portable child safety seat. Even further, it provides such a method further comprising the steps of: providing at least one first timer to provide an initial timed alert of from about 5 seconds to about 30 seconds; and providing at least one second timer to provide at least one second timed alert after a pre-determined time of between about 5 minutes and about 10 minutes. Even further, it provides such a method further comprising the step of connecting such actuation of the at least one perceptible alert to at least one vehicle alarm system.

In accordance with another preferred embodiment hereof, this invention provides a system, relating to reminding at least one driver of a motor vehicle that there is at least one child occupant in the motor vehicle, comprising: child-present sensor means for sensing the presence of a child in the motor vehicle; vehicle electrical sensor means for sensing the presence of an active vehicle electrical accessory system; vehicle-alert means for alerting at least one vehicle area adjacent the child occupant; and alarm processor means for receiving signals from such child-present sensor means, such vehicle electrical sensor means, and sending at least one signal to such vehicle-alert means; wherein such system may alert the at least one driver of a motor vehicle that there is at least one child occupant in the motor vehicle. Even further, it provides such a system further comprising timer means for providing at least one delayed timer alert.

In accordance with a preferred embodiment hereof, this invention provides a system, relating to reminding at least the driver of a motor vehicle, having at least one engine start-key cylinder operable by at least one engine start key, that there is at least one second occupant in the motor vehicle, comprising: at least one occupant detector structured and arranged to detect the presence of at least one second occupant within the motor vehicle; and at least one engine start-key release preventer structured and arranged to prevent engine start-key release of the ignition key from the engine start-key cylinder; wherein when such at least one second occupant is detected, the release of the ignition key from the engine start-key cylinder is prevented; and wherein at least the driver of a motor vehicle may be reminded of the presence of the at least one second occupant in the vehicle prior to such release of the engine start-key from the engine start-key cylinder. Moreover, it provides such a system further comprising at least one override releaser structured and arranged to override such engine start-key release preventer to permit engine start-key release from the engine start-key cylinder.

Additionally, it provides such a system wherein: such at least one override releaser is structured and arranged to require at least one driver manual-action to operate such at least one override releaser; and such at least one driver manual-action comprises at least one purposeful manual action of the driver. Also, it provides such a system wherein such at least one override releaser comprises at least one switch. In addition, it provides such a system wherein such at least one switch comprises at least one button switch structured and arranged to override such engine start-key release preventer upon manual activation. And, it provides such a system wherein such at least one button switch is situate in such position to force the driver to turn to view the rear seat area prior to button switch activation.

Further, it provides such a system further comprising at least one visual alert structured and arranged to visually alert at least the driver when such at least one second occupant is detected and the release of the ignition key from the engine start-key cylinder is prevented by such at least one engine start-key release preventer. Even further, it provides such a system further comprising at least one audible alert structured and arranged to audibly alert at least the driver when such at least one second occupant is detected and the release of the ignition key from the engine start-key cylinder is prevented by such at least one engine start-key release preventer.

Moreover, it provides such a system wherein such at least one occupant detector comprises at least one seat belt sensor structured and arranged to sense clasping of at least one seat belt. Additionally, it provides such a system wherein such at least one occupant detector comprises at least one occupant-weight sensor structured and arranged to sense the weight of the at least one second occupant. Also, it provides such a system further comprising: at least one child safety seat structured and arranged to support the at least one second occupant within the motor vehicle; wherein such at least one child safety seat comprises at least one sensor structured and arranged to provide at least one sensor output signal when a child is present in such at least one child safety seat. In addition, it provides such a system wherein such at least one override releaser is structured and arranged to require removing such child from such at least one child safety seat detector to perform such driver manual-action.

And, it provides such a system wherein such at least one override releaser is structured and arranged to require activating such at least one button switch to perform such driver manual-action. Further, it provides such a system further comprising at least one park-position transmission activator structured and arranged to activate such at least one engine start-key release preventer when an operational selector of an automatic transmission of the motor vehicle is not in a "PARK" position. Even further, it provides such a system further comprising: at least one visual alert structured and arranged to visually alert at least the driver when such at least one second occupant is detected and an ignition switch of the motor vehicle is moved from an "ON" position to an "ACCESSORY" position; and at least one audible alert structured and arranged to audibly alert at least the driver when such at least one second occupant is detected and the ignition switch of the motor vehicle is moved to the from an "ON" position to the "ACCESSORY" position.

Even further, it provides such a system further comprising at least one electrical circuit structured and arranged to activate such at least one visual alert, such at least one audible alert, and such at least one engine start-key release preventer using electrical current made available by the motor vehicle when the ignition switch is in such "ACCESSORY" position. Even further, it provides such a system wherein such at least one electrical circuit comprises: at least one detector circuit operably coupled to such at least one occupant detector triggered by such at least one detector circuit, at least one transistor-based control switch structured and arranged to control of the electrical current supplied to such at least one visual alert, such at least one audible alert, and such at least one engine start-key release preventer by such at least one electrical circuit. Even further, it provides such a system further comprising such motor vehicle.

In accordance with another preferred embodiment hereof, this invention provides a method, relating to preventing abandonment of at least one passenger occupant, within a cabin of a motor vehicle, after operation of the motor vehicle has ceased, such method comprising the steps of: providing at least one first sensor to sense the presence of the at least one passenger occupant, wherein such at least one first sensor provides at least one occupant-present signal signaling the presence of the at least one passenger occupant within the cabin; accessing at least one vehicle-status signal signaling that the operation of the motor vehicle has ceased; providing at least one alert actuator to actuate at least one perceptible alert alerting at least one individual to a possible abandonment of the at least one passenger occupant within the cabin of the motor vehicle; and providing at least one user-operable coupler to detachably couple such at least one first sensor with such at least one alert actuator, wherein at least one first coupler portion of such at least one user-operable coupler is integrated within at least one seat-belt restraint component of the motor vehicle; providing within such at least one alert actuator at least one interval timer structured and arranged to time at least one selected time interval having an interval start and an interval end; wherein such at least one alert actuator is structured and arranged to initiate the interval start of the at least one selected time interval when such at least one occupant-present signal signals the presence of the at least one passenger occupant within the cabin and such at least one vehicle-status signal signals that the operation of the motor vehicle has ceased, and initiate the actuation of the at least one perceptible alert if, on reaching the interval end, such at least one occupant-present signal continues to signal the presence of the at least one passenger occupant within such at least one portable child safety seat and such at least one vehicle-status signal continues to signal that the operation of the motor vehicle remains ceased.

Moreover, it provides such a method further comprising the steps of: providing at least one portable child safety seat to support the at least one passenger occupant with the cabin of the motor vehicle; and integrating such at least one first sensor within such at least one portable child safety seat; wherein at least one second coupler portion of such at least one user-operable coupler is integrated within such at least one portable child safety seat. In accordance with another preferred embodiment hereof, this invention provides a method, relating to preventing abandonment of at least one passenger occupant, within a cabin of a motor vehicle, after operation of the motor vehicle has ceased, such method comprising the steps of: providing at least one first sensor to sense the presence of the at least one passenger occupant within the cabin of the motor vehicle; providing at least one portable child safety seat to support the at least one passenger occupant with the cabin of the motor vehicle; and integrating such at least one first sensor within such at least one portable child safety seat; providing at least one user-operable coupler to detachably couple such at least one first sensor with such at least one alert system of the motor vehicle integrating at least one first coupler portion of such at least one user-operable coupler within at least one seat-belt restraint component of the motor vehicle; and integrating at least one second coupler portion of such at least one user-operable coupler is integrated within such at least one portable child safety seat.

In accordance with another preferred embodiment hereof, this invention provides a system, relating to reminding at least the driver of a motor vehicle, having at least one engine start-key cylinder operable by at least one engine start key, that there is at least one second occupant in the motor vehicle, comprising: occupant detector means for detecting the presence of the at least one second occupant within the motor vehicle; engine start-key release preventer means for preventing engine start-key release of the ignition key from the engine start-key cylinder; and wherein when such second occupant is detected, the release of the ignition key from the engine start-key cylinder is prevented; and wherein at least the driver of a vehicle may be reminded of the presence of the at least one second occupant in the vehicle prior to such release of the engine start-key from the engine start-key cylinder.

Furthermore, it provides such a system further comprising override releaser means for overriding such engine start-key release preventer means to permit engine start-key release from the engine start-key cylinder. Even further, it provides such a system wherein such override releaser means requires driver manual-action means for permitting purposeful manual action of the driver to operate such override releaser means.

Moreover, it provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
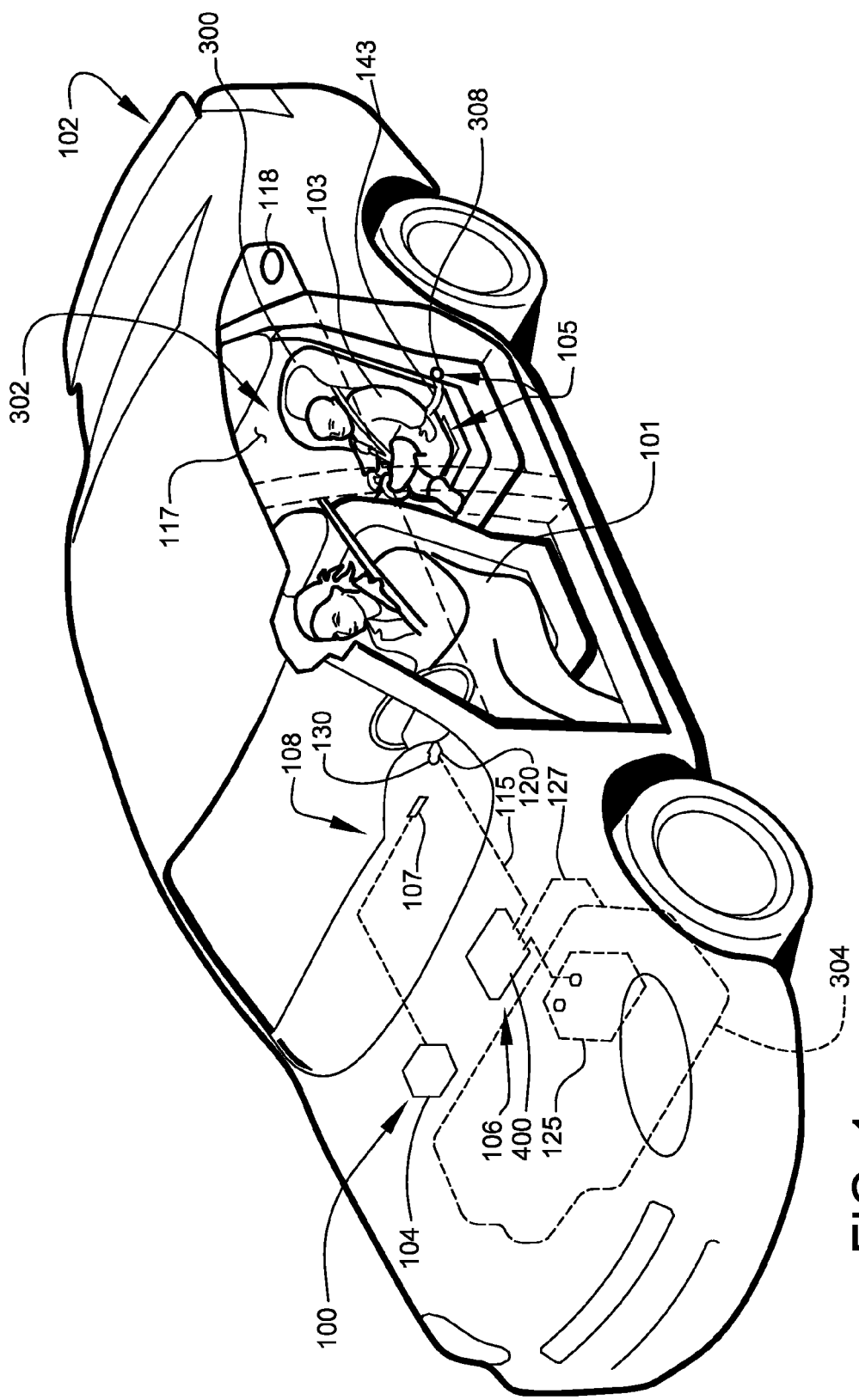
FIG. 1 shows a perspective view, illustrating use of a vehicle comprising a driver reminder system, according to a preferred embodiment of the present invention.

FIG. 1 shows a perspective view, illustrating vehicle 102 equipped with a Driver Reminder System (herein after referred to as DRS 100), according to a preferred embodiment of the present invention. The principle purpose of DRS 100 is to remind vehicle operator 101 of the presence of one or more secondary vehicle occupants 103 within vehicle cabin 117. The generation of such reminders by the system preferably coincides with a "shutting off" of vehicle 102. DRS 100 preferably assists in preventing secondary vehicle occupants 103 (or other damageable materials) from being left behind in vehicle 102 by making vehicle operator 101 aware of the presence of secondary vehicle occupants 103 within vehicle 102. DRS 100 is preferably structured and arranged to alert vehicle operator 101 essentially the moment the operation of the vehicle ignition circuit 115 is terminated and before the vehicle's operator has commenced exiting vehicle 102. DRS 100 preferably utilizes, in part, the existing electrical safety apparatus of vehicle 102.

In the depiction of FIG. 1, vehicle operator 101 is shown seated in the front seat with a secondary vehicle occupant 103 (in this preferred example a child/infant) located out of the operator's direct view, positioned generally behind vehicle operator 101. Vehicle operator 101 has parked vehicle 102 and has used the vehicle's existing ignition-key assembly 130 to terminate operation of the vehicle prior to exiting vehicle cabin 117. According to another preferred embodiment described herein, turning the ignition key turns off the vehicle electrical ignition power circuit (See FIGS. 14-15).

Figure 2A:
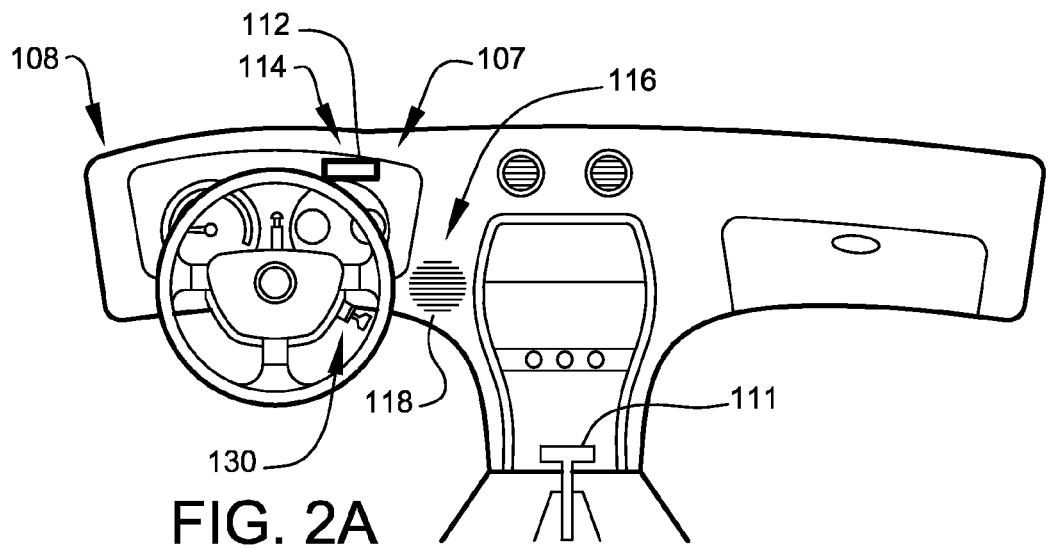
FIG. 2A shows an elevation view, illustrating dashboard warning components, according to a preferred embodiment of the present invention.

DRS 100 preferably comprises a set of visual-auditory warning components 107 preferably added to the dashboard region 108 of vehicle 102, as shown (see also FIG. 2A). In addition, the system is preferably coupled to the vehicle's existing onboard ignition key interlock 120, which is capable of blocking the removal of the vehicle's key 132 from ignition-key assembly 130 (see also FIG. 4).

Should DRS 100 detect the presence of one or more secondary vehicle occupants 103 on termination of vehicle operation, DRS 100 preferably activates warning components 107 to provide visual and audio warnings inside the vehicle cabin and preferably enables the vehicle's existing onboard ignition key interlock 120 to prevent removal of the vehicle's key 132 from ignition-key assembly 130. Preferably, vehicle operator 101, on acknowledging the warnings provided by DRS 100, may then deactivate DRS 100, which returns the vehicle to a customary operational mode.

Most current vehicle electrical systems 106 implement computer-assisted monitoring and control of onboard vehicle systems, preferably including a manufacturer-supplied safety brake-transmission interlock sub circuit 127, as shown. Safety brake-transmission interlock sub circuit 127 prevents vehicle operator 101 from shifting the automatic transmission 304 of vehicle 102 out of "PARK" without first depressing the brake pedal, and prevents removal of key 132 without first shifting the transmission into "PARK". DRS 100 is preferably designed to seamlessly interoperate with the existing vehicle electrical system 106 by adding occupant detection to the vehicle's pre-existing safety functions.

DRS 100 preferably comprises warning components 107, system control circuit 104, and one or more onboard occupant sensors 105 adapted to detect the presence of secondary vehicle occupant 103. It is noted that a highly preferred sensor arrangement of the system will be described in FIG. 8.

System control circuit 104 is preferably adapted to interpret signal inputs from occupant sensors 105 and, based on such sensor data, appropriately operate both warning components 107 and the vehicle's existing ignition key interlock 120. More specifically, DRS 100 is preferably designed to generate pre-defined outputs (such as ignition key removal prevention, visual and/or auditory warnings, etc.), in response to at least one signal from occupant sensors 105 suggesting the presence of a secondary vehicle occupant 103 within vehicle cabin 117. Thus, DRS 100 assists reminding the primary vehicle operator 101 of the presence of secondary vehicle occupants 103 (such as a child) to prevent vehicle operator 101 from unintentionally leaving a secondary occupant 103 in the vehicle. Upon reading this specification, those with ordinary skill in the art will now appreciate that, under appropriate circumstances, considering such issues as user preferences, marketing preferences, cost, technological advances, etc., a reminder for other than a living occupant such as, for example, a reminder for a perishable object, such as, foods, make-up, candles, gifts, medicines, etc., may suffice.

FIG. 2A shows an elevation view, illustrating preferred dashboard warning components 107 of DRS 100. Dashboard warning components 107 are preferably adapted to communicate at least one perceptible alert indicating to vehicle operator 101 the presence of one or more secondary occupants 103. The preferred locating of such alert apparatus within the dashboard region 108 of the vehicle cabin maximizes the potential for observation and acknowledgement by vehicle operator 101. Dashboard warning components 107 preferably comprise at least one visual warning 112, preferably comprising at least one light 114. Also customarily located within dashboard region 108 is the existing ignition key assembly 130, preferably utilized by DRS 100 to provide an additional alert in the form of a key-removal blocking feature, as further described in FIG. 3. In one preferred embodiment of the system, dashboard warning components 107 further comprises at least one auditory warning device 116, preferably comprising at least one audio chime unit 118, as best shown in FIG. 2A. In a more preferred arrangement, auditory warning device 116 is located in a rear portion of vehicle cabin 117, generally adjacent to secondary vehicle occupants 103, as best illustrated in FIG. 1, thus encouraging vehicle operator 101 to turn toward the rear occupants of the vehicle when the chime is activated.

Figure 3:
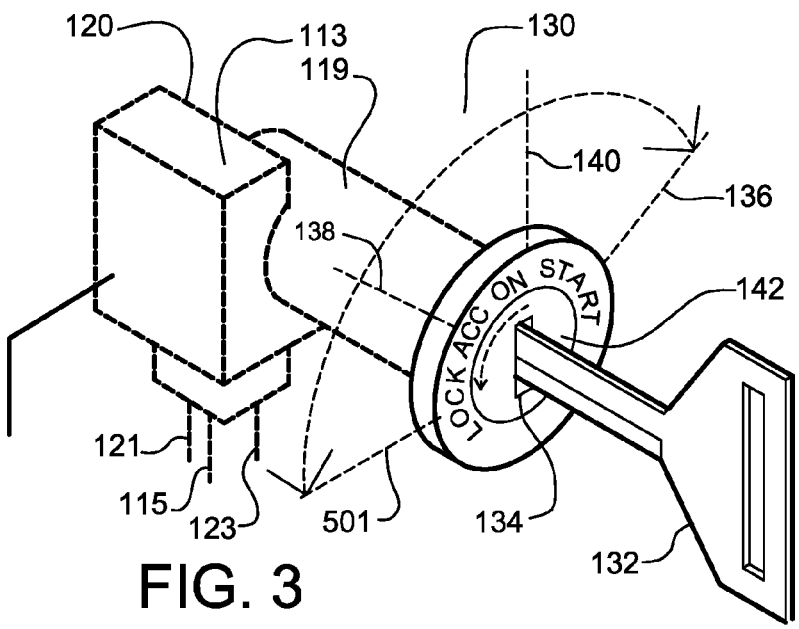
FIG. 3 shows a perspective view, illustrating an ignition key assembly of the vehicle of FIG. 1.

FIG. 3 shows a perspective view, illustrating an ignition key assembly 130 provided with vehicle 102. FIG. 3 shows a representational drawing of the existing factory-supplied ignition-key assembly 130 of vehicle 102. Ignition-key assembly 130 comprises a multi-position electrical switch 119 operated by rotation of an engine-key cylinder 142, as shown. Engine-key cylinder 142 comprises a key slot 134 into which an ignition key 132 may be placed, as shown. Multi-position electrical switch 119 is typically adapted to control the operation of the accessory power circuit 121, ignition circuit 115, and engine starter circuit 123, as shown. Upon reading this specification, those with ordinary skill in the art will now appreciate that, under appropriate circumstances, considering such issues as cost, user preference, advances in technology, etc., other ignition circuit arrangements such as, for example, keyless ignition technology interoperating with a vehicle's Electronic Control Unit (ECU), alternate keyed ignition switches and or circuits that are integrated more directly within the onboard computer control subsystem, etc., may suffice.

In most late-model vehicles, once ignition key 132 has been placed into key slot 134, ignition key 132 may be momentarily positioned in the "START" position 136 (to initiate the operation of the engine starter), the "ON" position 140 (during driving), and the "ACCESSORY" (ACC) position 138 on termination of vehicle operation. In addition, most vehicle manufacturers utilize an off or "LOCK" position 501, as shown, in which ignition key 132 must be placed before removal from key slot 134 is permitted.

The existing engine-start ignition key interlock 120 of vehicle 102 is designed to prevent the ignition key 132 from being removed from engine-key cylinder 142, unless shift lever 111 (operational selector) of the automatic transmission 304 is placed in the "PARK" position. When shift lever 111 is in any position other than park, electrical solenoid 113 of ignition key interlock 120 is activated by the vehicle's existing onboard electrical system 106, making it impossible for ignition key 132 to be removed.

During conventional operation, the existing brake-transmission interlock sub circuit 127 of the vehicle's onboard electrical system 106 deactivates electrical solenoid 113 when the vehicle transmission has been placed in the "PARK" position. This allows ignition key 132 to be removed from engine-key cylinder 142. In such conventional operation, removal of ignition key 132 is possible regardless of the presence of secondary vehicle occupants 103. DRS 100 preferably modifies the operation of ignition key interlock 120 by maintaining the key-retention operation of electrical solenoid 113 when one or more secondary vehicle occupants 103 are detected by DRS 100.

Figure 4:
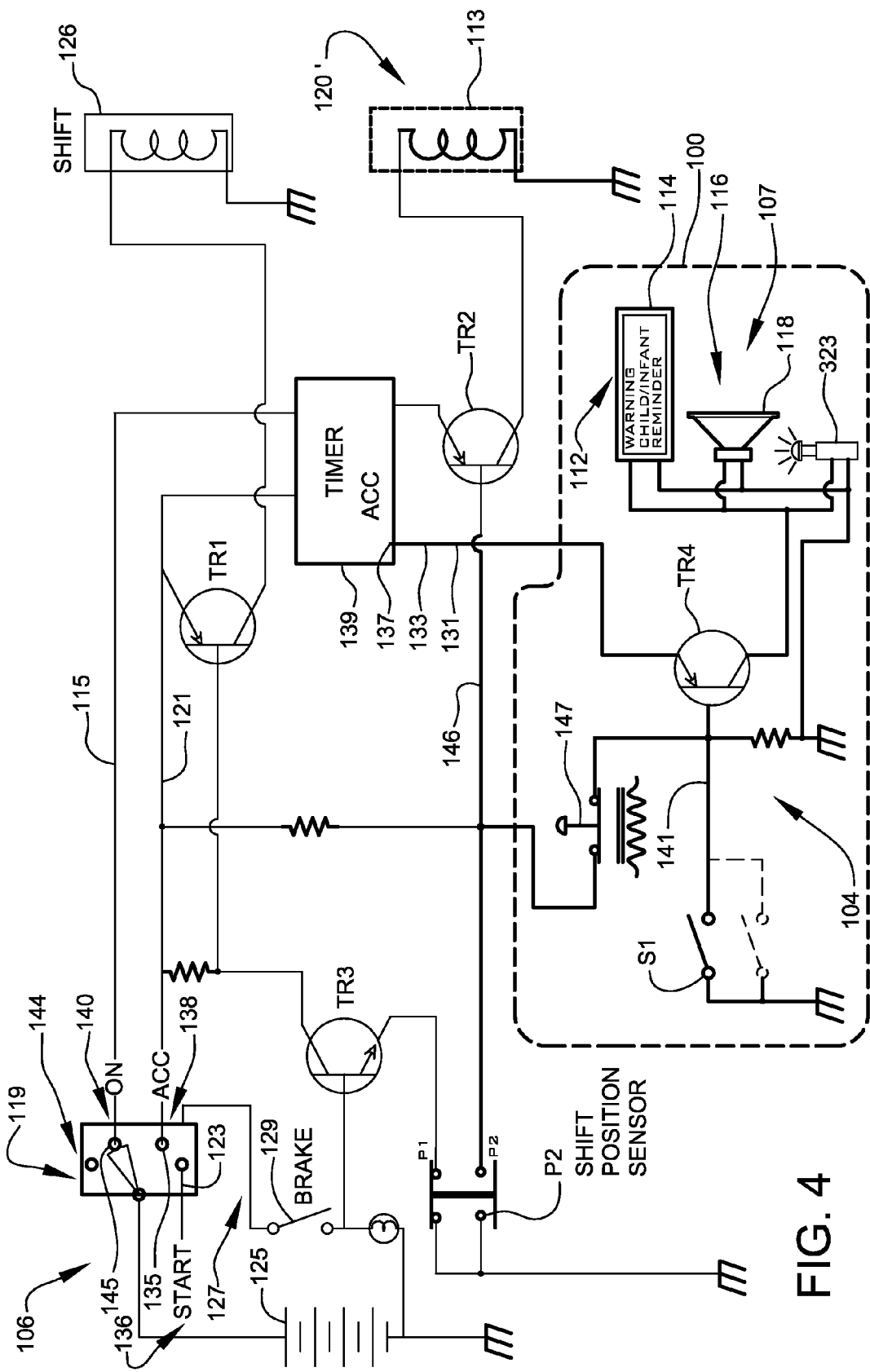
FIG. 4 shows a schematic circuit diagram illustrating the driver reminder system incorporated into a vehicle with an automatic shift interlock device, according to a preferred embodiment of the present invention.
Figure 5:
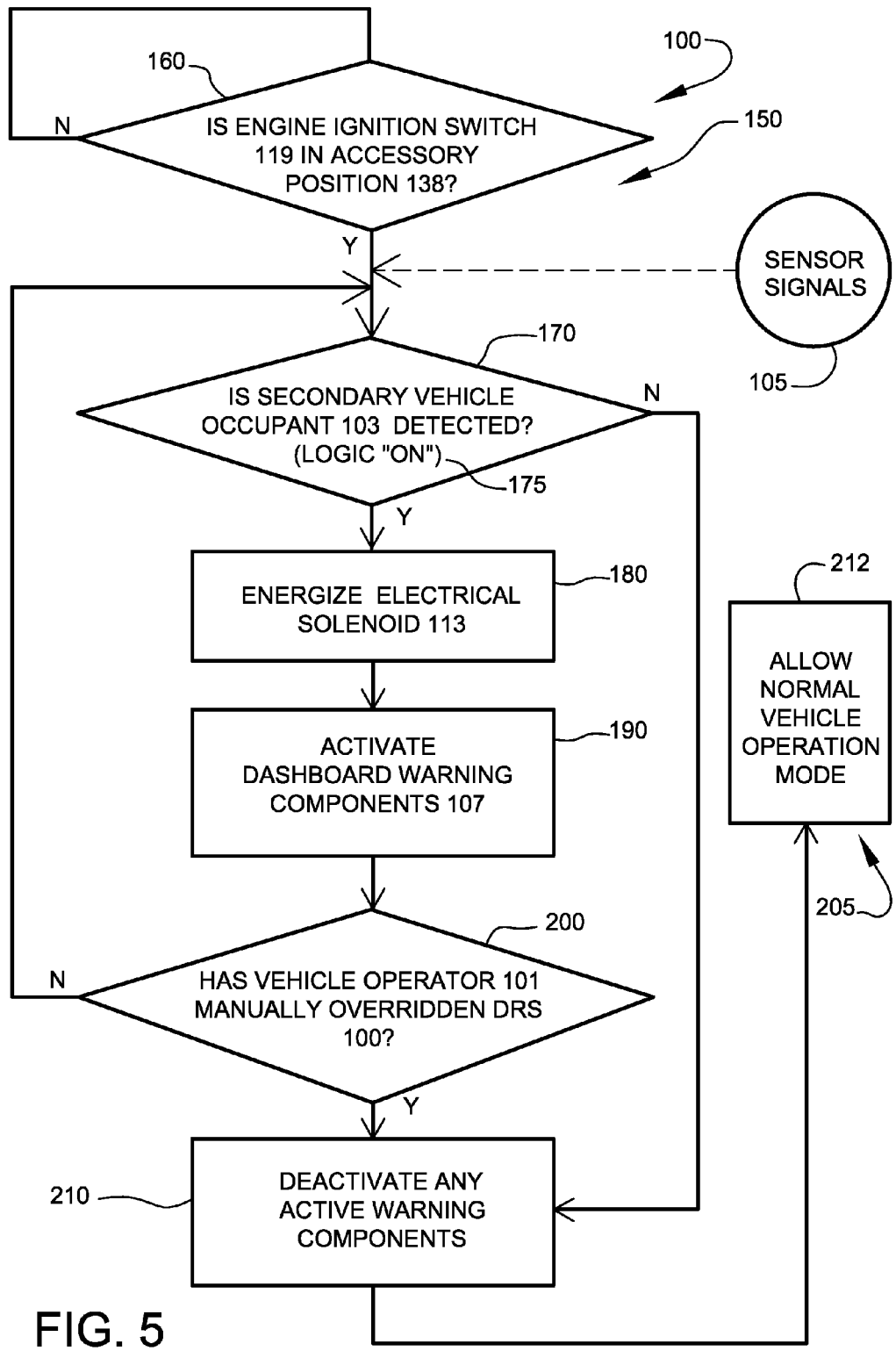
FIG. 5 shows a diagram, illustrating preferred logic sequencing of the system, according to a preferred embodiment of the present invention.

FIG. 4 shows a schematic circuit diagram illustrating a preferred integration of DRS 100 within the existing vehicle electrical system 106 of vehicle 102. FIG. 5 shows logic diagram 150, illustrating preferred logic sequencing of DRS 100, according to the preferred embodiment of the present invention. For clarity, the electrical components of DRS 100 are contained within the graphical dashed-line boundary of FIG. 4.

In reference to the schematic circuit diagram FIG. 4, the existing vehicle electrical system 106 preferably includes an existing power source 125, such as the vehicle battery, and an existing brake-transmission interlock sub circuit 127 that controls the operation of engine-start ignition key interlock 120, as shown. As previously noted, vehicles equipped with such automatic-transmission interlock systems are adapted to mechanically block the removal of ignition key 132 until the vehicle's automatic transmission is placed into the "PARK" position. Although not utilized by DRS 100, it is noted that brake-transmission interlock sub circuit 127 also comprises a shift lever solenoid 126 that prevents the movement of the vehicle transmission out of "PARK" until brake switch 129 is closed.

Preferably, no portion of the existing brake-transmission interlock sub circuit 127 is removed or altered by the addition of DRS 100. All pre-existing functions of brake-transmission interlock sub circuit 127 are preferably maintained after installation of DRS 100.

System control circuit 104 of DRS 100 preferably adds an additional solid-state device, preferably a transistor, more preferably a bi-polar junction PNP transistor identified herein as TR4, as shown. TR4 preferably comprises at least one solid-state transistor having a collector current rating appropriate to the load requirement of warning components 107. TR4 preferably activates and deactivates warning components 107 by controlling the passage of electrical current through supply circuit 131, as shown. Preferably, positive lead 133 of supply circuit 131 is electrically coupled to the existing ACC terminal 135 of engine ignition switch 119, most preferably by establishing electrical connection 137 at existing timer circuit 139, as shown. When engine ignition switch 119 is moved to accessory position 138, existing timer circuit 139 is adapted to energize electrical connection 137 for a set duration (for example, a maximum of about one hour to prevent the vehicle battery from being fully discharged). It is noted that electrical connection 137 of supply circuit 131 preferably derives the supply current from the ACC terminal 135 only; thus, electrical current is preferably supplied to electrical connection 137 only when engine ignition switch 119 is in accessory position 138 and not in the "ON" position 140, as shown.

Electrical connection 137 is preferably coupled to the emitter of TR4, as shown. Preferably, electrical connection 137 provides a voltage, $V_{E4}$, greater than the rated "cut-in" voltage of TR4. When switch S1 is open, the base of TR4 is biased to receive a voltage, $V_{B4}$, no less than the voltage, $V_{E4}$, provided to the emitter of TR4. As such, when switch S1 is open, the voltage of the emitter relative to the voltage of the base, $V_{EB4}$, is preferably less than the rated cut-in voltage of TR4. Consequently, no current passes through the collector and emitter of TR4. However, when switch S1 is closed, the base of TR4 is grounded and $V_{B4}$ equals ground (i.e., zero). As such, when switch S1 is closed, the voltage of the emitter relative to the voltage of the base, $V_{EB4}$, equals the voltage of the emitter, $V_{E4}$, which is greater than the rated cut-in voltage of TR4. Consequently, the current supplied by electrical connection 137 is preferably passed through TR4 to warning components 107. In the preferred configuration of detector circuit 141, the base of TR4 can only be grounded when switch S1 is set to an "ON" (closed) condition.

The operation of switch S1 preferably corresponds to the operation of occupant sensors 105 described in FIG. 1. For example, a preferred embodiment of S1 preferably comprises an electrical detector switch 308 integrated within the rear-passenger seat belts 143, preferably adapted to close on clasping of the seat-belt buckles, as generally illustrated in FIG. 1 (at least embodying herein at least one seat belt sensor structured and arranged to sense clasping of at least one seat belt).

In such an embodiment, the S1 "ON" logic of detector circuit 141 would result from having any rear-passenger seat belt 143 fastened. More preferred system logic is yet more discriminatory, wherein the detector switch S1 would only be set to an "ON" (closed) condition by, for example, sensing the presence of a child in child seat 300. Preferred implementation of such occupant-specific logic requires the combination of multiple occupant sensors 105, preferably targeting variables such as occupant weight, seat belt deployment length, latching arrangements, etc. Preferred embodiments of DRS 100 preferably comprise a child-specific safety restraint such as child seat 300. In this alternate preferred embodiment of the system, child seat 300 is structured and arranged to both support the second occupant within the motor vehicle and incorporate at least one occupant sensor 105 to provide at least one sensor output signal when a child is present. Such a seat 300 preferably comprises a means for extending detector circuit 141 to the seat, for example, by a wired conductor or wireless connection to DRS 100.

It is noted that the preferred activation of warning components 107 only occurs when S1 is "ON" (closed) and engine ignition switch 119 is in accessory position 138. In any other conditional state, DRS 100 preferably remains unobtrusively inactive (it is however noted that at least one preferred embodiment of the system is configured to operate when other conditions arise, for example, as generally described in FIG. 9). Furthermore, in another preferred embodiment, S1 is closed not by sensors, but by a reminder switch that must be physically selected to a "reminder on" position by the driver. In this embodiment, there would be no override switch provided; rather, the driver would simply turn the reminder switch to "OFF" thereby canceling the warnings and allowing key removal.

The closing of S1 also preferably provides an alternate way to ground the existing base circuit 146 of existing bi-polar junction PNP transistor TR2. TR2 is typically incorporated within the vehicle's existing electronic control unit (ECU 400). The base of TR2 is electrically coupled to the existing shift position switch P2 by means of existing base circuit 146, as shown. Typically, TR2 is biased to operate in "cutoff" mode while shift position switch P2 is open and shift lever 111 is in "PARK."

In the conventional operation of vehicle 102, the existing shift position switch P2 is "ON" (closed) when shift lever 111 is in a position other than "PARK." Typically, TR2 is biased to operate in "active" mode while shift position switch P2 is closed. In "active mode," the emitter of TR2 is electrically coupled to both "ACC" terminal 135 and "ON" terminal 145 of via existing timer circuit 139, as shown, and receives a voltage, $V_{E2}$. Typically, $V_{E2}$ is greater than the rated "cut-in" voltage of TR4. Current from existing "ACC" terminal 135 and existing "ON" terminal 145 of the existing engine ignition switch 119 flows to TR2 through existing timer circuit 139 when engine ignition switch 119 is in either accessory position 138 or "ON" position 140. Base circuit 146 of TR2 is grounded by the closing of the existing shift position switch P2. When shift position switch P2 is closed, the base of TR2 is grounded and $V_{B2}$ equals ground (i.e., zero). As such, when shift position switch P2 is closed, the voltage of the emitter relative to the voltage of the base, $V_{EB2}$, equals the voltage of the emitter, $V_{E2}$, which is greater than the rated cut-in voltage of TR2. Consequently, the current supplied to the emitter of TR2 is preferably passed through TR2 thereby energizing electrical solenoid 113 and preventing removal of key 132 from engine ignition switch 119.

Preferably, detector circuit 141 of DRS 100 is also electrically coupled to base circuit 146, as shown. If switch S1 is set to an "ON" (closed) condition, base circuit 146 of TR2 preferably remains grounded, regardless of the condition of the existing shift position switch P2. This preferred arrangement maintains operable current to electrical solenoid 113 preventing removal of the ignition key 132 from engine ignition switch 119. Preferably, electrical solenoid 113 remains energized until switch S1 is set to an "OFF" (open) condition, by removal of secondary vehicle occupants, or vehicle operator 101 overrides DRS 100 using key release button 147, as further described below.

Figure 2B:
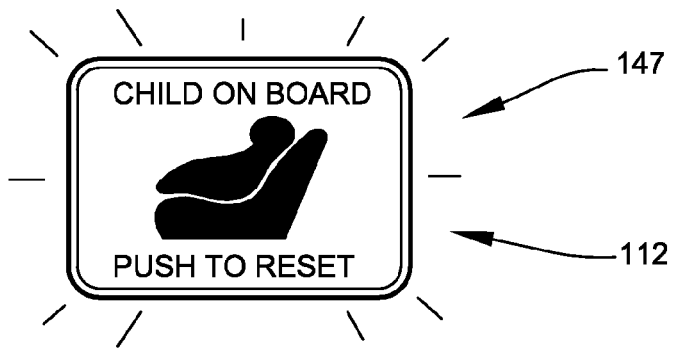
FIG. 2B shows an elevation view, illustrating a combined dashboard warning component and system override switch, according to a preferred embodiment of the present invention.

DRS 100 preferably comprises key release button 147 to permit vehicle operator 101 to suspend the operation of DRS 100 after being alerted of the presence of secondary vehicle occupants 103 within vehicle 102. Key release button 147 preferably interrupts the ground path of detector circuit 141, as shown, preferably controlling the base currents at both TR2 and TR4. Depressing key release button 147 preferably allows removal of ignition key 132, which in turn cancels the audio and visual warnings and releases key release button 147 to a closed position. It is noted that key release button 147 preferably de-energizes the shift lock solenoid only when it is energized by DRS 100. Energizing of electrical solenoid 113 by the closure of existing switch P2 of existing vehicle electrical system 106 is preferably unaffected by the operation of key release button 147. Upon reading this specification, those with ordinary skill in the art will now appreciate that, under appropriate circumstances, considering such issues as cost, user preference, etc., other key-release arrangements such as, for example, providing a non-latching momentary-action key release comprising a normally-closed, momentary-open switch, etc., may suffice. In such a configuration, the driver would use one hand to push and hold the switch, while turning the ignition key to "LOCK" with the other hand (the key release button would necessarily need to be near the ignition key cylinder). It is also noted that preferred embodiments of key release button 147 are preferably combined with visual warnings 112, as best illustrated in FIG. 2B. In this alternate arrangement of the system, key release button 147 comprises a push button switch comprising a visual warning 112 in the form of an integral warning light.

Key release button 147 preferably comprises a normally closed switch that is preferably held open electromagnetically, with current available only with the shift key in the ACC position, until engine ignition switch 119 is turned to "OFF" position 144. If the existing shift position switch P2 is open, pushing key release button 147 preferably removes power from the key-lock electrical solenoid 113 by terminating the secondary ground path through detector circuit 141. When engine ignition switch 119 is turned to "OFF" position 144, this switch preferably closes automatically, preferably resetting DRS 100. Key release button 147 is preferably located in a convenient position within vehicle cabin 117, more preferably in dashboard region 108, most preferably adjacent the steering column. Alternately preferably, key release button 147 is located in a position that requires vehicle operator 101 to face the rear seat area 302, thus placing secondary vehicle occupants 103 within the driver's field of view. Preferred embodiments of key release button 147 preferably comprise an integral illuminated icon 323 suggesting the function of the device, as shown. It is noted that, in one alternate preferred embodiment of the system, the key-release button 147 is a momentary-open switch that must be held open to allow the ignition key return to lock. In at least one other preferred embodiment of the apparatus continue to operate, even after vehicle operator 101 has used key release button 147 to suspend the operation of DRS 100. The preferred implementation of this alternate preferred embodiment utilizes the vehicle horn to notify persons outside vehicle 102 of a potential forgotten child (or other occupant), but only when specific conditions arise, as generally described in FIG. 9.

Reference is now made to the FIG. 5 showing logic diagram 150, illustrating preferred logic sequencing of DRS 100. As previously noted, DRS 100 has two main functions. First, DRS 100 is configured to prevent ignition key removal if the system logic is "ON", indicating the presence of secondary vehicle occupants 103. Secondarily, DRS 100 preferably functions to activate audio and visual warnings when the ignition key/engine ignition switch 119 is moved to accessory position 138 with system logic in the "ON" condition.

In reference to the diagram, DRS 100 is preferably maintained in standby loop 160 until vehicle operator 101 stops the vehicle engine by placing engine ignition switch 119 in accessory position 138. Once engine ignition switch 119 is moved to accessory position 138, DRS 100 progresses to determination step 170 wherein the state of the system logic 175 is determined based on the device status of one or more occupant sensors 105 (e.g., switch S1 of FIG. 4).

If in step 170 DRS 100 determines that system logic 175 is "ON", indicating the presence of secondary vehicle occupants 103, then DRS 100 moves to step 180 preferably energizing electrical solenoid 113 (to prevent removal of key 132) and the cotemporaneous step 190 of activating dashboard warning components 107 to produce additional warning alerts. If DRS 100 determines that system logic 175 comprises an "OFF" condition, indicating that no secondary vehicle occupants 103 are present, then DRS 100 preferably moves to step 212 placing vehicle 102 in normal operation mode 205, as shown.

Following step 180 and step 190, DRS 100 preferably enters determination step 200 to determine if vehicle operator 101 has suspended the operation of DRS 100 using key release button 147. If vehicle operator 101 has manually overridden DRS 100 (using key release button 147), DRS 100 enters step 210 de-energizing electrical solenoid 113 to allow removal of key 132. DRS 100 then preferably enters step 212 placing vehicle 102 in normal operation mode 205, as shown. If in determination step 200, DRS 100 determines than no manual override has occurred, the system returns to determination step 170 wherein the state of the system logic 175 is again determined based on the device status of the occupant sensors 105. This sequence preferably repeats until such time that vehicle operator 101, preferably the driver, initiates either a manual override in step 200 or removes the secondary vehicle occupants 103 from the sensor area (child car seat 300, for example) thereby moving DRS 100 to resume normal vehicle operation in step 212 and initiate engine key release in step 210. Upon reading this specification, those with ordinary skill in the art will now appreciate that, under appropriate circumstances, considering such issues as design preference, user preferences, marketing preferences, cost, structural requirements, available materials, technological advances, etc., other vehicle decision and status display arrangements such as, for example, embedded vehicle logic systems, programmable logic, interactive status monitor screens, additional lights on instrument panel indicating status of child/infant, etc., may suffice.

Figure 6:
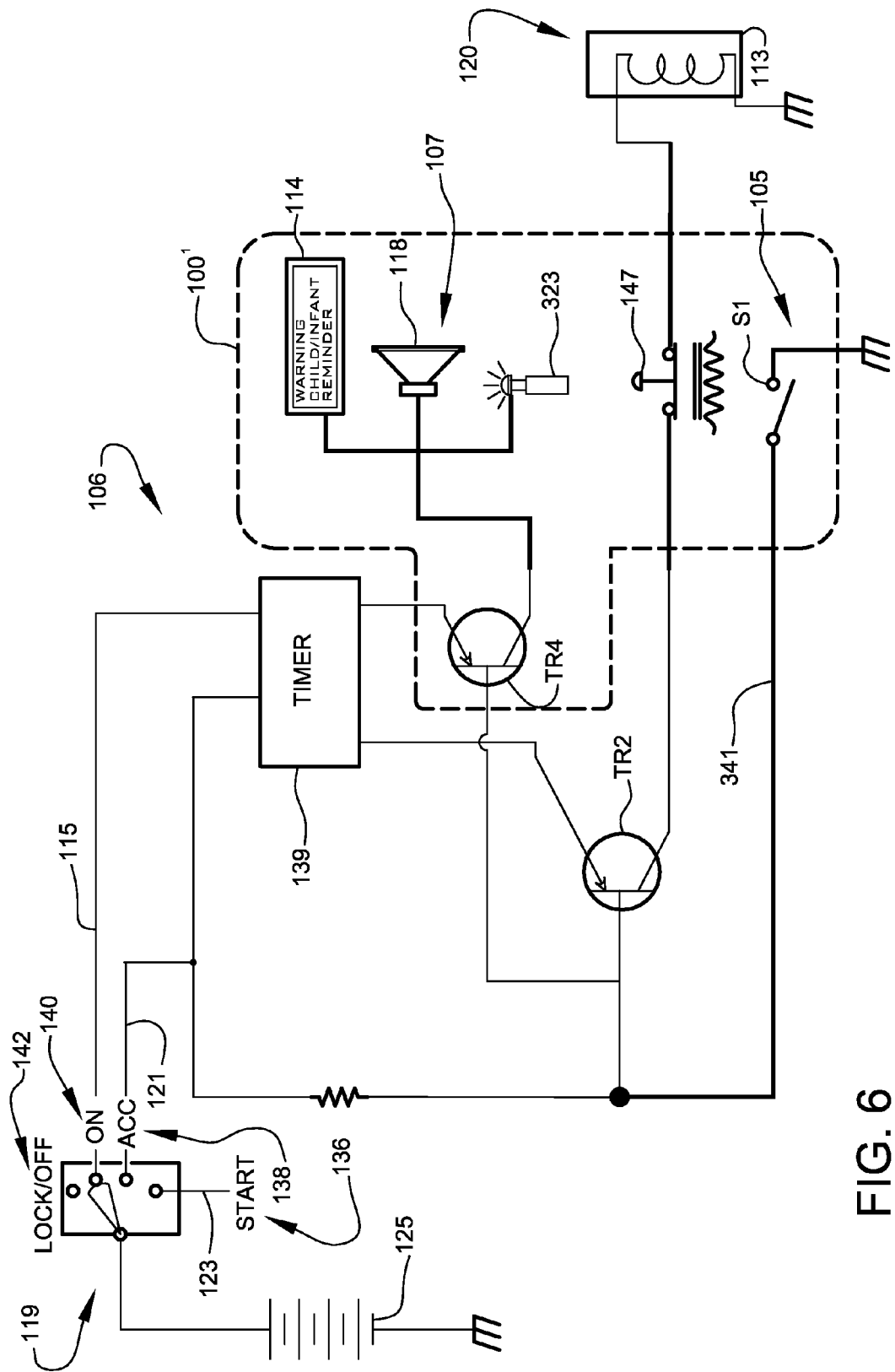
FIG. 6 shows a schematic, illustrating the driver reminder system incorporated into a vehicle with a manual shift interlock device, according to a preferred embodiment of the present invention.

FIG. 6 shows a schematic, illustrating alternate preferred embodiment DRS 100' incorporated into vehicle 102 having a manual transmission and engine-start ignition key interlock 120, according to an alternate preferred embodiment of the present invention. Installation of DRS 100' within a manual shift vehicle is substantially the same as that of the above-described DRS 100; thus, only the differences between the two systems will be discussed.

The preferred retrofitting of DRS 100' to a manual shift vehicle adds the solid state transistor TR4 of DRS 100, preferably a bi-polar junction PNP transistor. DRS 100' preferably utilizes transistor TR4 to actuate the operation of dashboard warning components 107, as shown, and transistor TR2 of ECU 400 to control electrical solenoid 113.

The power circuit 121 is connected to the emitter of TR4, via timer circuit 139, as shown. Preferably, the emitter receives a voltage, $V_{E4}$, greater than the rated "cut-in" voltage of TR4. When switch S1 is open, the base of TR4 is biased to receive a voltage, $V_{B4}$, no less than the voltage, $V_{E4}$, provided to the emitter of TR4. As such, when switch S1 is open, the voltage of the emitter relative to the voltage of the base, $V_{EB4}$, is preferably less than the rated cut-in voltage of TR4. Consequently, no current passes through the collector and emitter of TR4. However, when switch S1 is closed, the base of TR4 is grounded and $V_{B4}$ equals ground (i.e., zero). As such, when switch S1 is closed, the voltage of the emitter relative to the voltage of the base, $V_{EB4}$, equals the voltage of the emitter, $V_{E4}$, which is greater than the rated cut-in voltage of TR4. Consequently, current passes through the collector and emitter of TR4 and voltage is supplied to warning components 107. In the preferred configuration of detector circuit 141, the base of TR4 can only be grounded when switch S1 is set to an "ON" (closed) condition.

Existing factory transistor TR2 of vehicle 102 is preferably used by DRS 100' to maintain electrical current to electrical solenoid 113 when switch S1 is "ON" (closed). In a preferred implementation of the circuit, the base of existing factory transistor TR2 is electrically coupled to detector circuit 341, as shown. DRS 100' preferably also comprises key release button 147 to permit vehicle operator 101 to suspend the operation of DRS 100' after being alerted of the presence of secondary vehicle occupants 103 within vehicle 102.

In operation, the power circuit 121 is connected to the emitter of TR2, via timer circuit 139, as shown. Preferably, the emitter receives a voltage, $V_{E2}$ greater than the rated "cut-in" voltage of TR2. When switch S1 is open, the base of TR2 is biased to receive a voltage, $V_{B2}$, no less than the voltage, $V_{E2}$, provided to the emitter of TR2. As such, when switch S1 is open, the voltage of the emitter relative to the voltage of the base, $V_{EB2}$, is preferably less than the rated cut-in voltage of TR2. Consequently, no current passes through the collector and emitter of TR2. However, when switch S1 is closed, the base of TR2 is grounded and $V_{B2}$ equals ground (i.e., zero). As such, when switch S1 is closed, the voltage of the emitter relative to the voltage of the base, $V_{EB2}$, equals the voltage of the emitter, $V_{E2}$, which is greater than the rated cut-in voltage of TR2. Consequently, current passes through the collector and emitter of TR2 and voltage is supplied to the key lock solenoid 120' of ignition key interlock 120.

Figure 7:
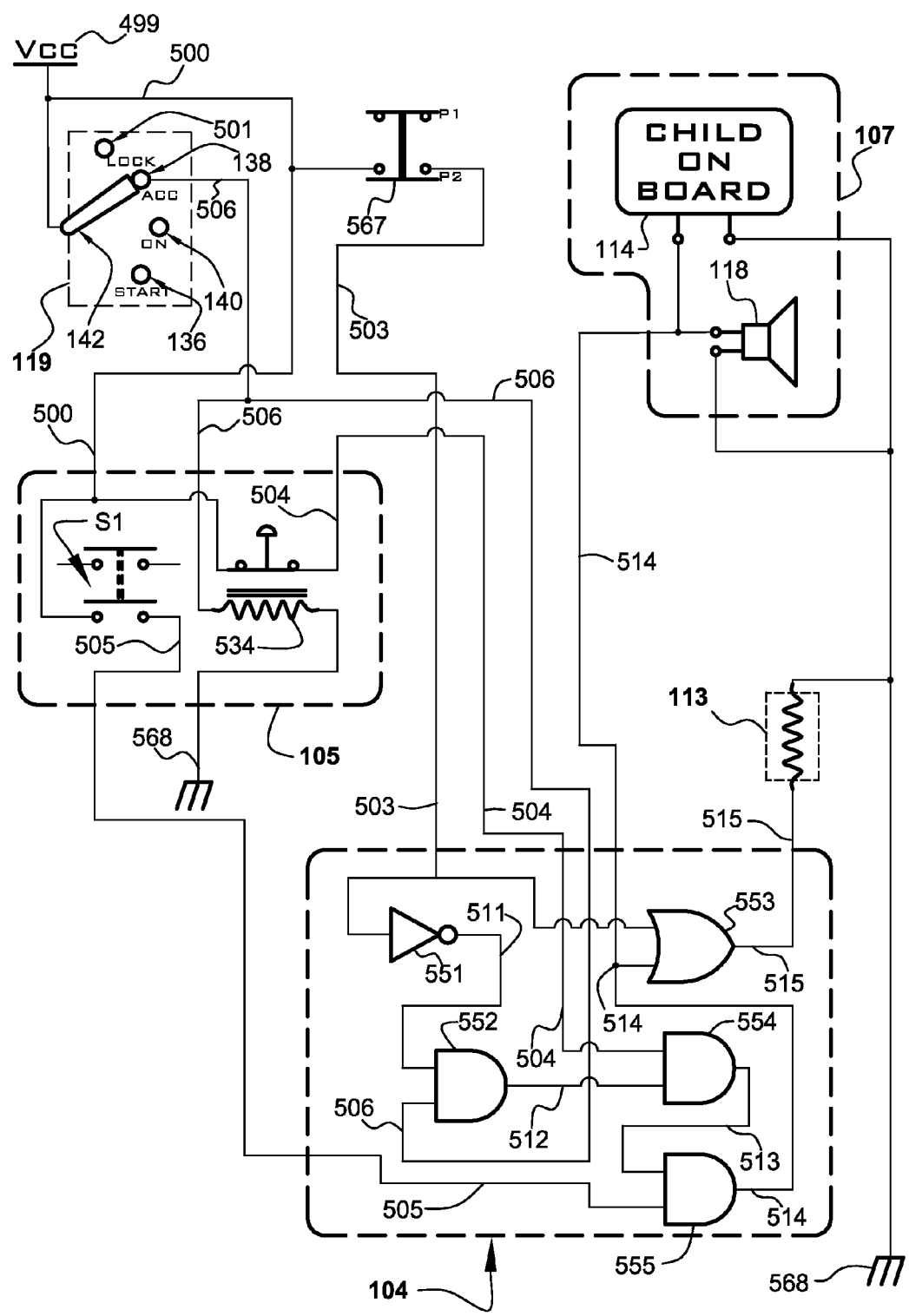
FIG. 7 shows a functional schematic, illustrating the driver reminder system according of FIG. 1.

FIG. 7 shows a functional schematic illustrating the driver reminder system according to a preferred embodiment of the invention. It is noted that portions of the diagram have been "abstracted" to depict the underlying functions of system components and circuit arrangements.

Direct current voltage 499 is provided as an input to multi-position switch 119, shift position switch 567 and occupant sensors 105 by means of power conduit 500. Multi-position switch 119 comprises engine-key cylinder 142 that may be alternatively connected to "LOCK" position 501, "accessory" (ACC) position 138, "ON" position 140 or "START" position 136. When multi-position electrical switch 119 is in "ACCESSORY" (ACC) position 138, then power conduit 500 provides direct current voltage 499 to accessory conduit 506. Direct current voltage 499 is then provided as an input to occupant sensors 105 and system control circuit 104 by means of accessory conduit 506.

Shift position switch 567 comprises two different switches, P1 and P2, operating in tandem. When a vehicle's gear shift is in "park," then switch P1 is "closed" and switch P2 is "open." Conversely, when a vehicle's gear shift is not in "park," then switch P1 is "open" and switch P2 is "closed." Switch P2 is normally "open." Switch P2 "closes" when the vehicle's gear shift is out of "park". When switch P2 "closes" then direct current voltage 499 passes from power conduit 500 through switch P2 and into out-of-park signal conduit 503. Direct current voltage 499 is then provided as an input to shift position P2 inverter 551 and key-lock OR gate 553 by means of out-of-park signal conduit 503.

Occupant sensors 105 comprise switch S1 and manual override button 532. Switch S1 is normally "open," such as when no secondary vehicle occupant 103 is detected. However, switch S1 is "closed" when a secondary vehicle occupant 103 is detected. When secondary vehicle occupant 103 is detected, thereby closing switch S1, then direct current voltage 499 passes from power conduit 500, through switch S1 and into child present signal conduit 505. Direct current voltage 499 is provided as an input to system control circuit 104 by means of child-present signal conduit 505. Manual override button 532 comprises manual override switch 533 and electromagnet 534. Manual override button 532 is normally spring-loaded to a "closed" position. When a user depresses manual override button 532 thereby "opening" manual override switch 533 that switch will then immediately return to its spring-loaded "closed" position unless it is held open by electromagnet 534. Electromagnet 534 receives power from accessory conduit 506. Unless ignition switch 525 is connected to accessory contact 522, electromagnet 534 has no power and is inactive. However, when ignition switch 525 is connected to accessory conduit 506, electromagnet 534 generates a magnetic field with sufficient force to restrain override switch 533 in the "open position" when override button 532 has been depressed by a user. Under normal circumstances, direct current voltage 499 passes from power conduit 500, through the normally closed manual override switch 533 and into no-interrupt signal conduit 504. Direct current voltage 499 is provided as an input to system control circuit 104 by means of no-interrupt signal conduit 504.

System control circuit 104 comprises shift position signal inverter 551, shift-lock AND gate 552, key-lock OR gate 553, interrupt AND gate 554, and child-alert AND gate 555. Shift position signal inverter 551 receives input from out-of-park signal conduit 503. Shift position signal inverter 551 receives direct current voltage 499 as an input from out-of-park signal conduit 503 when the vehicle's gear is out of "park" and switch P2 is "closed." Conversely, shift position signal inverter 551 does not receive direct current voltage 499 as an input when the vehicle's gear is in "park" and switch P2 is "open."

When shift position signal inverter 551 does not receive direct current voltage 499 as an input, it produces direct current voltage 499 as an output. Conversely, when shift position signal inverter 551 receives direct current voltage 499 as an input, it does not produce direct current voltage 499 as an output. In sum, shift position signal inverter 551 will output direct current voltage 499 into in-park signal conduit 511 only when the vehicle's gear is in "park" and switch P2 is open.

In-park signal conduit 511 is one of two inputs to accessory "AND gate" 552. Accessory "AND gate" 552 performs the Boolean logic "AND" function upon its inputs. Accessory "AND gate" 552 receives input from in-park signal conduit 511 and accessory conduit 506. Accessory "AND gate" 552 will produce direct current voltage 499 as an output if, and only if, accessory "AND gate" 552 receives direct current voltage 499 as an input from both in-park signal conduit 511 and from accessory conduit 506. In sum, accessory "AND gate" 552 will output direct current voltage 499 into unlock-key signal conduit 512 only when the vehicle's gear is in "park" and the ignition is in "accessory."

Unlock-key signal conduit 512 is one of two inputs to interrupt "AND gate" 554. Interrupt "AND gate" 554 performs the Boolean logic "AND" function upon its inputs. Interrupt "AND gate" 554 receives input from unlock-key signal conduit 512 and manual interrupt signal conduit 504. Interrupt "AND gate" 554 will produce direct current voltage 499 as an output if, and only if, interrupt "AND gate" 554 receives direct current voltage 499 as an input from both unlock-key signal conduit 512 and from no-interrupt signal conduit 504. In sum, interrupt "AND gate" 554 will output direct current voltage 499 into no-interruption signal conduit 513 only when the vehicle's gear is in "park," the ignition is in "accessory," and the manual override button has not been depressed.

No-interruption signal conduit 513 is one of two inputs to child-alert "AND gate" 555. Child-alert "AND gate" 555 performs the Boolean logic "AND" function upon its inputs. Child-alert "AND gate" 555 receives input from no-interruption signal conduit 513 and child-present signal conduit 505. Child-alert "AND gate" 555 will produce direct current voltage 499 as an output if, and only if, child-alert "AND gate" 555 receives direct current voltage 499 as an input from both no-interruption signal conduit 513 and from child-present signal conduit 505. In sum, child-alert "AND gate" 554 will output direct current voltage 499 into warning signal conduit 514 only when the vehicle's gear is in "park," the ignition is in "accessory," the manual override button has not been depressed, and a child is detected.

Warning signal conduit 514 is input to warning components 107. When child-alert "AND gate" 555 outputs direct current voltage 499, then direct current voltage 499 is provided as an input to warning light 541 and audible alert 542 by means of warning signal conduit 514. In sum, warning light 541 and audible alert 542 are activated when the vehicle's gear is in "park," the ignition is in "accessory," the manual override button has not been depressed, and a child is detected.

Warning signal conduit 514 is one of two inputs to key-lock "OR gate" 553. Key-lock "OR gate" 553 performs the Boolean logic "OR" function upon its inputs. Key-lock "OR gate" 553 receives input from warning signal conduit 514 and out-of-park signal conduit 503. Key-lock "OR gate" 553 will produce direct current voltage 499 as an output if key-lock "OR gate" 553 receives direct current voltage 499 as an input from warning signal conduit 514, or from out-of-park signal conduit 503 or from both. In sum, key-lock "OR gate" 553 will output direct current voltage 499 into key-lock signal conduit 515 if the vehicle's gear is not in park or if a warning signal has been generated by the presence of a child.

Key-lock signal conduit 515 is input to key-lock solenoid 570. When activated, key-lock solenoid prevents a driver from turning the key from the accessory position to the lock position to prevent the driver from removing the key. Upon reading this specification, those with ordinary skill in the art will now appreciate that, under appropriate circumstances, considering such issues as cost, user preference, etc., other circuit arrangements such as, for example, providing an under-hood disabling switch to disable the alert components should a system failure occur, etc., may suffice. Furthermore, upon reading this specification, those with ordinary skill in the art will now appreciate that, under appropriate circumstances, considering such issues as cost, user preference, etc., other circuit arrangements such as, for example, providing a simple on-off rocker-type switch to actuate a reminder system, etc., may suffice. Preferably, such an arrangement would not use sensing devices; rather, the apparatus would preferably comprise an on-off rocker-type "reminder" switch on or near dashboard region 108. Selecting "ON" would place this system in "reminder mode" wherein the key release on solenoid would be energized and when the ignition key was moved to "ACC" the visual and audible warnings would occur. This system would not require an override switch; the driver would be alerted to the possible presence of a passenger occupant by visual and audible warnings, when turning the motor off, and would simply move the rocker switch from "reminder mode" to OFF", canceling the warning and de-energizing the key-lock solenoid.

Figure 8:
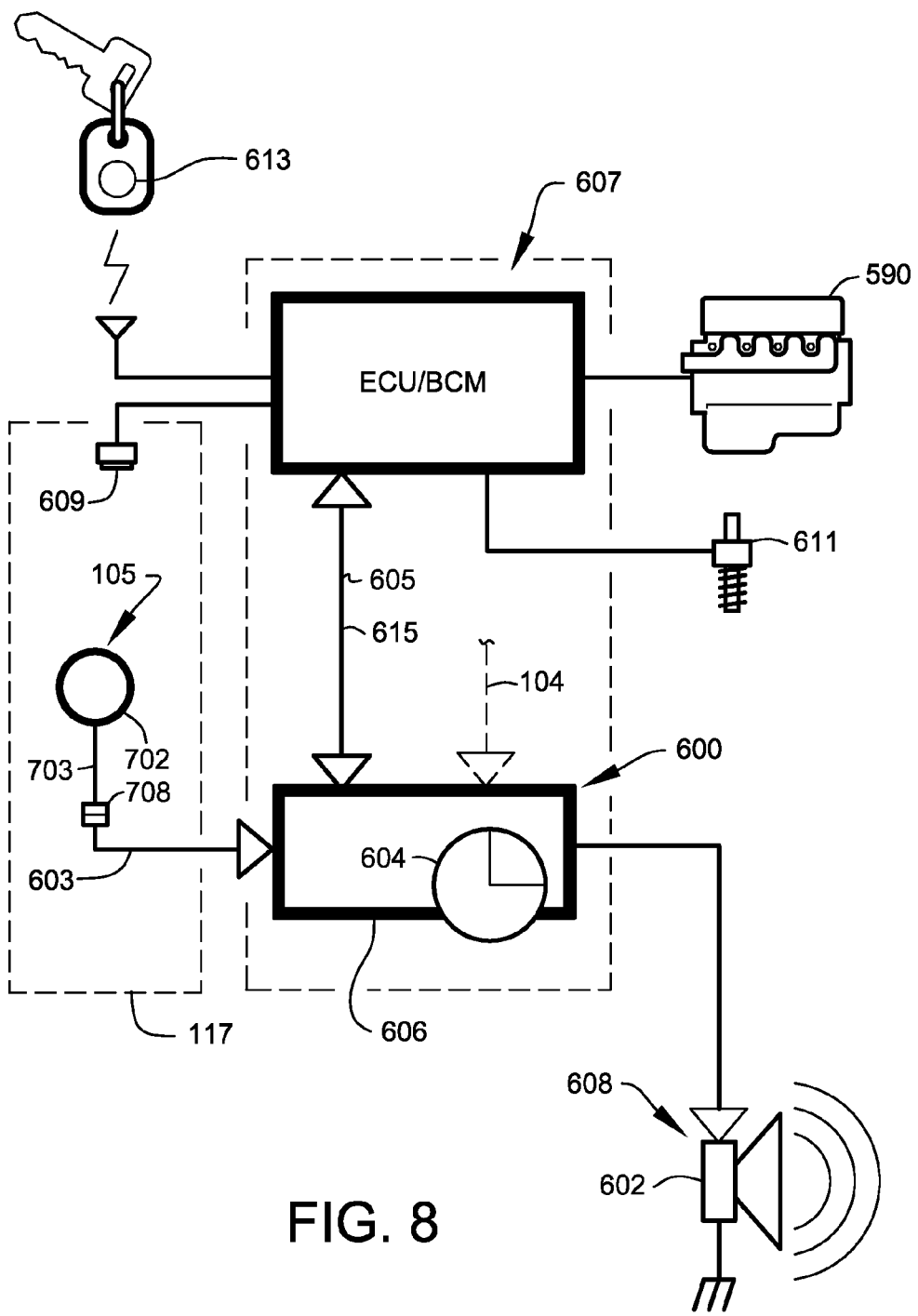
FIG. 8 shows a schematic diagram, illustrating an enhanced-reminder subsystem of the driver reminder system, incorporated into a vehicle, according to another preferred embodiment of the present invention.

FIG. 8 shows a schematic diagram, illustrating an enhanced-reminder subsystem 600, incorporated into a vehicle 102, according to another preferred embodiment of the present invention. Enhanced-reminder subsystem 600 is preferably intended to provide an additional "emergency" alert level within the driver-reminder system, preferably operating subsequent to the disabling of the primary alert functions of DRS 100. Enhanced-reminder subsystem 600 is preferably designed to function substantially independently of the primary operation of DRS 100; and preferably operates as a stand-alone unit in other alternate preferred embodiments of the invention. This arrangement assures that the life-safety protection afforded by Applicant's main system functions cannot be entirely disabled through intentional misuse or inadvertent user action.

Enhanced-reminder subsystem 600 is preferably designed to automatically initiate the emergency alert only after a specified time has passed, preferably subsequent to stopping of the vehicle's engine 590, and only when a secondary vehicle occupant 103 is recognized to be in a detectable area of vehicle cabin 117, such as child seat 300.

Referring to the diagram of FIG. 8, enhanced-reminder subsystem 600 is preferably configured to receive an "occupant-present" signal 603 from at least one onboard occupant sensor 105, as shown. This signal is preferably sent directly from the sensor, or alternately by means of a pass-through circuit of system control circuit 104, or alternately by means of signal data acquired from the Electronic Control Unit (ECU 607) of vehicle 102; however, the later arrangements are less preferred. These preferred arrangements at least embody herein providing at least one first sensor to sense the presence of the at least one passenger occupant, wherein such at least one first sensor provides at least one occupant-present signal 603 signaling the presence of at least one passenger occupant (secondary vehicle occupant 103) within vehicle cabin 117.

Furthermore, enhanced-reminder subsystem 600 is preferably configured to access at least one "vehicle-status" signal 605 signaling that the operation of vehicle 102 has ceased. In one preferred embodiment of the system, "vehicle-status" signal 605 is derived from ECU 607 of vehicle 102, as shown. ECU 607 preferably is an embedded system that controls one or more of the electrical systems or subsystems in vehicle 102, such as, for example, engine operation, drive train operation, door locks, ignition locks, etc. Other common terms for ECU 607 include electronic control module (ECM), central control module (CCM), control unit, or simply control module. In some vehicles, ECU 607 may be divided into several interoperating units, such as for example, an Engine Control Unit (ECU), Body Control Unit (BCM), etc.

In a vehicle with a keyless ignition system, "vehicle-status" signal 605 is most preferably derived from ECU 607. In such a "keyless" system, pushing start-stop button 609 terminates operation of engine 590. ECU 607 is preferably configured to generate "vehicle-status" signal 605 essentially concurrently with the pushing of start-stop button 609 and termination of the operation of engine 590 (in such a keyless vehicle arrangement, the receiving of vehicle-status signal 605 is roughly analogous to the electrical signals generated by movement of a conventional ignition switch from "ON" position 140 to accessory "ACC" position 138, as previously described). It is noted that one alternate preferred configuration of enhanced-reminder subsystem 600 acquires the "vehicle-status" signal 605 from system control circuit 104 of DRS 100 and may preferably use this signal data to determine that both the primary reminder system and vehicle engine have been turned off.

Enhanced-reminder subsystem 600 preferably comprises Alert Actuator Unit (AAU 606) structured and arranged to actuate at least one perceptible alert 608 to alert at least one individual to a possible abandonment of secondary vehicle occupants 103 within vehicle cabin 117. One preferred form of the perceptible alert 608 comprises the actuation of vehicle horn 602. Upon reading this specification, those with ordinary skill in the art will now appreciate that, under appropriate circumstances, considering such issues as cost, user preference, etc., other alert arrangements such as, for example flashing of the vehicle lights, sending one or more wireless message alerts, preventing locking of the vehicle doors, etc., may suffice.

AAU 606 of enhanced-reminder subsystem 600 preferably comprises at least one interval timer 604 to time a delay between the stopping of the vehicle engine and actuation of the alert. The time interval associated with the delay is selected to allow normal driver tasks to be completed after the vehicle has stopped, while assuring that an inadvertently forgotten occupant remains within the vehicle cabin no more than a reasonably safe time interval. Applicant has found a time interval between the stopping of the engine and alarm of about fifteen minutes to provide a reasonable balance between safety and unobtrusive system operation (the above-described arrangements at least embody herein providing, within such at least one alert actuator, at least one interval timer structured and arranged to time at least one selected time interval having an interval start and an interval end) enables a delay in activation of vehicle horn 602 for a selected duration following engine shutdown).

The preferred logic of enhanced-reminder subsystem 600 initiates a countdown on determining the vehicle engine has been turned off and the signal output of onboard occupant sensor 105 is consistent with the presence of at least one secondary vehicle occupant 103 in child seat 300 (or another detectable location within the vehicle). Upon such recognition, AAC 606 of enhanced-reminder subsystem 600 preferably activates the electric vehicle horn 602 to sound off, preferably in a pattern not recognizable as a standard car alarm, such as an "SOS" pattern.

In more specific terms, the preferred logic of AAC 606 is preferably configured to initiate the interval start of the selected time interval when "occupant-present" signal 603 indicates the presence of a passenger occupant within vehicle cabin 117 and "vehicle-status" signal 605 signals that the operation of vehicle 102 has ceased. In the preferred logic of AAC 606, actuation of perceptible alert 608 is initiated if, on reaching the end of the timed interval, "occupant-present" signal 603 continues to signal the presence of the passenger occupant within vehicle cabin 117 and "vehicle-status" signal 605 continues to signal that the operation of vehicle 102 remains ceased. The preferred logic of enhanced-reminder subsystem 600 is further described in FIG. 9.

The preferred alignment of enhanced-reminder subsystem 600 with the vehicle ECU 607 permits other safety features and functions to be developed. For example, one preferred alternate embodiment of enhanced-reminder subsystem 600 is preferably configured to interoperate with the vehicle's body control module (a subsystem of ECU 607), which controls the operation of the electrically-actuated door locks 611 (See FIG. 8). In such an arrangement, enhanced-reminder subsystem 600 is configured to prevent locking of at least the driver's door of vehicle 102 when "occupant-present" signal 603 signals the presence of the passenger occupant within vehicle cabin 117 and "vehicle-status" signal 605 signals that the operation of vehicle 102 has ceased. The driver's door could only be locked by initiating a system override, for example, by the driver physically pushing an override button 613. This preferred embodiment arrangement is preferably enabled by a two-way communication link 615 between enhanced-reminder subsystem 600 and ECU 607, as shown. Upon reading this specification, those with ordinary skill in the art will now appreciate that, under appropriate circumstances, considering such issues as cost, user preference, safety regulations, etc., other system arrangements such as, for example, actuating the vehicle horn if a driver located outside the vehicle attempts to lock the doors with a passenger occupant remaining within the vehicle, deploying a door-latch blocker to physically block the latching mechanism of a door if a driver outside the vehicle attempts to lock the doors with a passenger occupant remaining within the vehicle, etc., may suffice.

Although Applicant envisions enhanced-reminder subsystem 600 to be primarily an "add-on" system to vehicle 102, preferred embodiments of enhanced-reminder subsystem 600 are preferably supplied from the manufacturer of vehicle 102 as an original equipment option. In this alternate preferred arrangement, enhanced-reminder subsystem 600 is preferably integrated within ECU 607.

Figure 9:
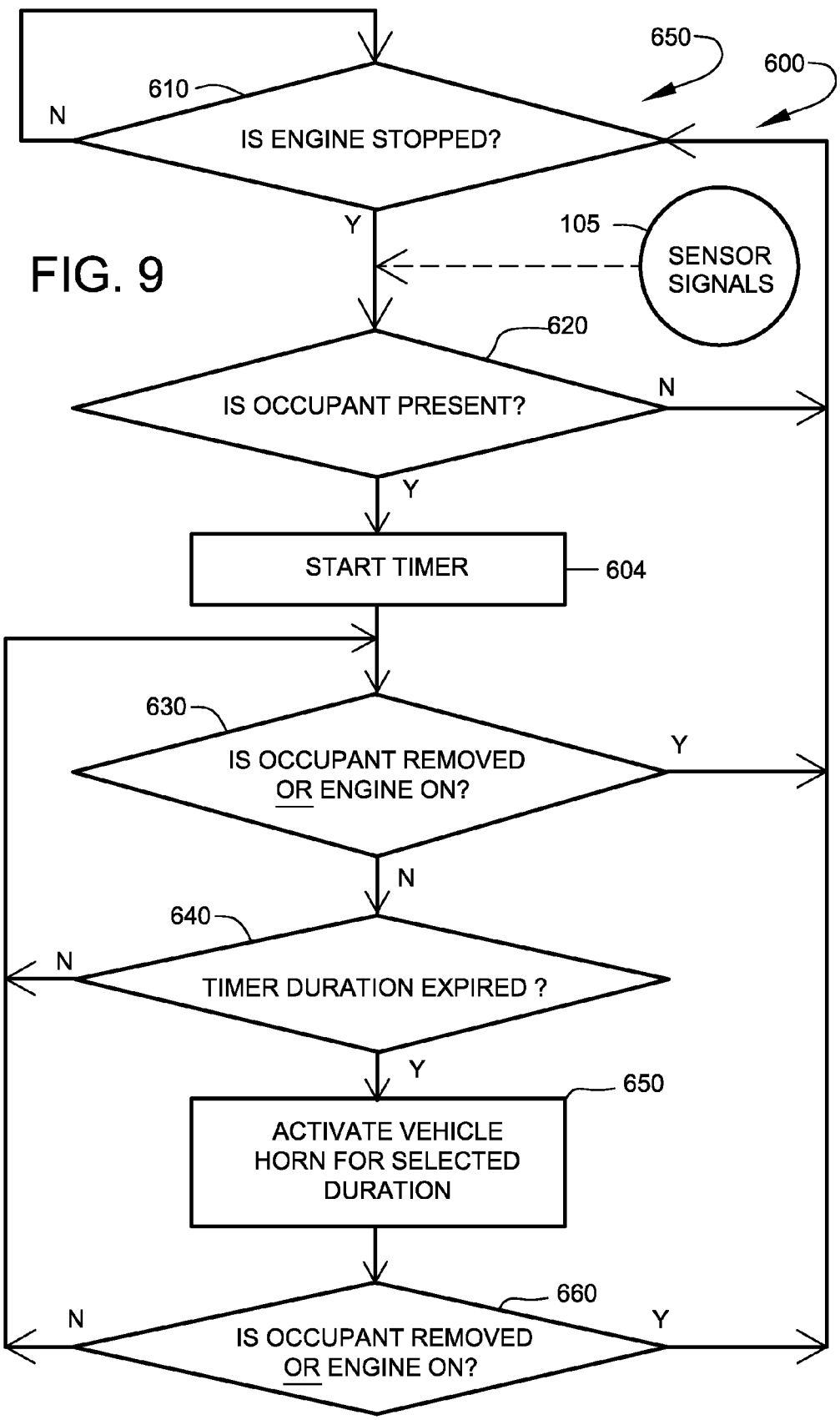
FIG. 9 shows a diagram, generally illustrating a preferred logic sequencing of the enhanced subsystem, according to the preferred embodiment of FIG. 8.

FIG. 9 shows a diagram, generally illustrating a preferred logic sequencing of enhanced-reminder subsystem 600, according to the preferred embodiment of FIG. 8. FIG. 9 shows logic diagram 650, illustrating preferred logic sequencing of enhanced-reminder subsystem 600. Operation of enhanced-reminder subsystem 600 is preferably initiated in determination step 610 wherein the system determines the status of engine operation by monitoring the "vehicle-status" signal 605. The system preferably loops until a "vehicle-status" signal 605 is received indicating the operation of engine 590 has stopped. The system then progresses to determination step 620 wherein the system determines the status of "occupant-present" signal 603. If "occupant-present" signal 603 indicates that no passenger occupant is within vehicle cabin 117, the system preferably returns to step 610. If "occupant-present" signal 603 indicates the presence of the passenger occupant within vehicle cabin 117, enhanced-reminder subsystem 600 preferably initiates a timed interval count-down using timer 604. Next, enhanced-reminder subsystem 600 progresses to determination step 630 wherein the system determines if the "occupant-present" signal 603 continues to indicate the presence of the passenger occupant within vehicle cabin 117 and "vehicle-status" signal 605 continues to signal that the operation of vehicle 102 remains ceased. If either of the two signal conditions change, that is, the system determines that either the "occupant-present" signal 603 suggests a removal of the passenger occupant from vehicle cabin 117 and/or the "vehicle-status" signal 605 indicates that the operation of vehicle 102 has restarted, the system resets and returns to step 610. If both of the two signal conditions remain the same, the system proceeds to check the status of the countdown in step 640. In step 640, enhanced-reminder subsystem 600 determines if the duration of the countdown has been exhausted. If the timed interval has not been exhausted, the system preferably loops back to determination step 630 and rechecks signal status. The system preferably loops until enhanced-reminder subsystem 600 determines that the timed interval has ended and the countdown is complete. On completion of the countdown, the system proceeds to step 650 and vehicle horn 602 is activated, as shown. From step 650, the system advances to determination step 660. In determination step 660, the system again determines if the "occupant-present" signal 603 continues to indicate the presence of the passenger occupant within vehicle cabin 117 and "vehicle-status" signal 605 continues to signal that the operation of vehicle 102 remains ceased. If either of the two signal conditions is found to have changed, that is, the system determines that either the "occupant-present" signal 603 suggests a removal of the passenger occupant from vehicle cabin 117 and/or the "vehicle-status" signal 605 indicates that the operation of vehicle 102 has restarted, the system resets and returns to step 610 to await the next vehicle engine shutdown signal. If both of the two signal states remain the same, the system preferably returns to step 650 wherein vehicle horn 602 is again activated. In one preferred embodiment of enhanced-reminder subsystem 600, activation of vehicle horn 602 is preferably configured to repeat every thirty seconds for up to about three hours. Upon reading this specification, those with ordinary skill in the art will now appreciate that, under appropriate circumstances, considering such issues as cost, user preference, etc., other signaling arrangements such as, for example, flashing of the vehicles headlights, etc., may suffice. Furthermore, upon reading this specification, those with ordinary skill in the art will now appreciate that, under appropriate circumstances, considering such issues as design preference, user preferences, marketing preferences, cost, structural requirements, available materials, technological advances, etc., other vehicle decision and status display arrangements such as, for example, prevention of door locking features, immediate audio/visual reminders on engine shutdown, deployment of door latching features, etc., may suffice. Furthermore, upon reading this specification, those with ordinary skill in the art will now appreciate that, under appropriate circumstances, considering such issues as design preference, user preferences, marketing preferences, cost, structural requirements, available materials, technological advances, etc., other vehicle decision and status display arrangements such as, for example, automatic shutdown and wakeup features, embedded vehicle logic systems, programmable logic, interactive status monitor screens, additional lights on instrument panel indicating status of child/infant, circuits to initiate the wireless sending of an alert message to a communication device, using a recorded or synthesized voice and dedicated speaker to provide a verbal alert, etc., may suffice.

Figure 10:
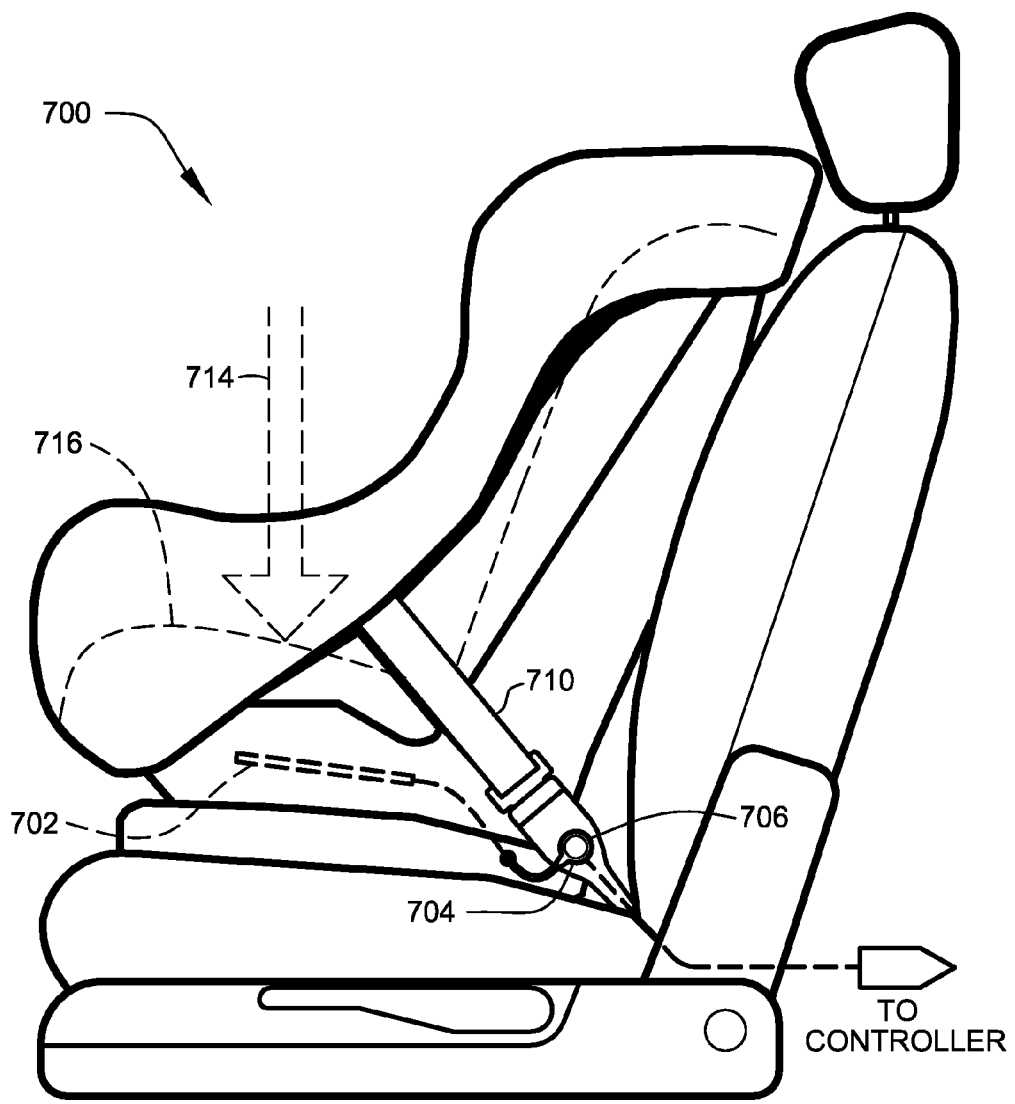
FIG. 10 shows a side view, of an intelligent child seat, for use within a vehicle having a driver reminder system, according to a preferred embodiment of the present invention.

FIG. 10 shows a side view, of an enhanced embodiment of child seat 300, identified herein as "intelligent" seat 700. Intelligent seat 700 is preferably used within a vehicle equipped with DRS 100, and or enhanced-reminder subsystem 600, according to a preferred embodiment of the present invention. Intelligent seat 700 preferably comprises a fully functional child or infant car seat designed to carry an infant or toddler securely in vehicle 102 (at least embodying herein a portable child safety seat to support the at least one passenger occupant with the cabin of the motor vehicle). Intelligent seat 700 is preferably configured to hold the child in a comfortable manner so that the child does not move about the car while it is being driven and restrains and prevents injury to the child in the event of an accident. The distinguishing feature of intelligent seat 700 is the preferred incorporation of an onboard occupant sensor 702 within the seat to identify the presence of an infant or child within the vehicle cabin and means for connecting the seat sensor to DRS 100, and or enhanced-reminder subsystem 600 (at least embodying herein integrating such at least one first sensor within such at least one portable child safety seat).

Figures 11, 12:
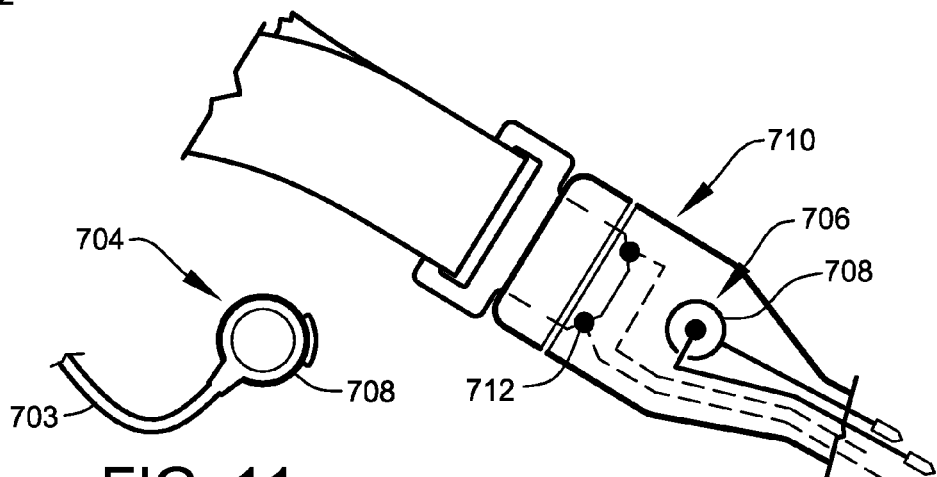
FIG. 11 shows a partial side view, magnified for clarity, of a signal coupler, of the intelligent child seat of FIG. 10.
FIG. 12 shows a partial side view, magnified for clarity, of a corresponding signal coupler, of the vehicle of FIG. 10.

Intelligent seat 700 preferably comprises at least one output signal coupler 704 structured and arranged to couple onboard occupant sensor 702 to the DRS 100 of the vehicle 102, as shown in FIG. 11. FIG. 11 shows a partial side view, magnified for clarity, of one preferred output signal coupler 704, of intelligent seat 700. Vehicle 102 preferably comprises at least one corresponding input signal coupler 706 provided as a means for interfacing output signal coupler 704 and the built-in sensor of intelligent seat 700 with DRS 100. FIG. 12 shows a partial side view, magnified for clarity, of one preferred corresponding input signal coupler 706 of vehicle 102. Both output signal coupler 704 and input signal coupler 706 preferably comprise a set of detachable interlocking connectors 708, which are preferably of a standardized format to permit intelligent seat 700 to be used in any vehicle equipped with DRS 100 and/or enhanced-reminder subsystem 600 (at least embodying herein at least one user-operable coupler and wherein at least one second coupler portion of such at least one user-operable coupler is integrated within such at least one portable child safety seat).

Output signal coupler 704 is illustrated as a flexible cable 703 extending outwardly from the side of intelligent seat 700. For user convenience, the interlocking connector 708 of input signal coupler 706 is shown integrated within the existing seatbelt assembly 710 of vehicle 102. Interlocking connector 708 preferably comprises at least one "tamper-proof" design to prevent accidental detachment of the signal conductors. When used with enhanced-reminder subsystem 600, onboard occupant sensor 702 preferably generates "occupant-present" signal 603 and input signal coupler 706 is operably coupled with enhanced-reminder subsystem 600.

Also depicted in FIG. 12 is a "seatbelt connected" sensor 712 used by some preferred embodiments of DRS 100 to identify when the seatbelt assembly 710 is latched. Upon reading this specification, those with ordinary skill in the art will now appreciate that, under appropriate circumstances, considering such issues as cost, user preference, etc., other coupler arrangements such as, for example, wireless interfaces, retractable cables, contact-based couplers, using a "seatbelt connected" sensor to transmit an "occupant-present" signal, etc., may suffice.

Onboard occupant sensor 702 preferably comprises a seat occupancy sensor, preferably of a type using at least one pressure detection technology, preferably at least one force sensor structured and arranged to generate "occupant-present" signal 603 when a downward force 714 is applied on surface 716 of intelligent seat 700 (which is associated with the presence of a secondary vehicle occupant 103 in the seat). Upon reading this specification, those with ordinary skill in the art will now appreciate that, under appropriate circumstances, considering such issues as cost, intended use, etc., other sensor arrangements such as, for example, CMOS cameras, IR sensors, optical sensors, deflection sensors, mechanical switches, etc., may suffice.

Figure 16:
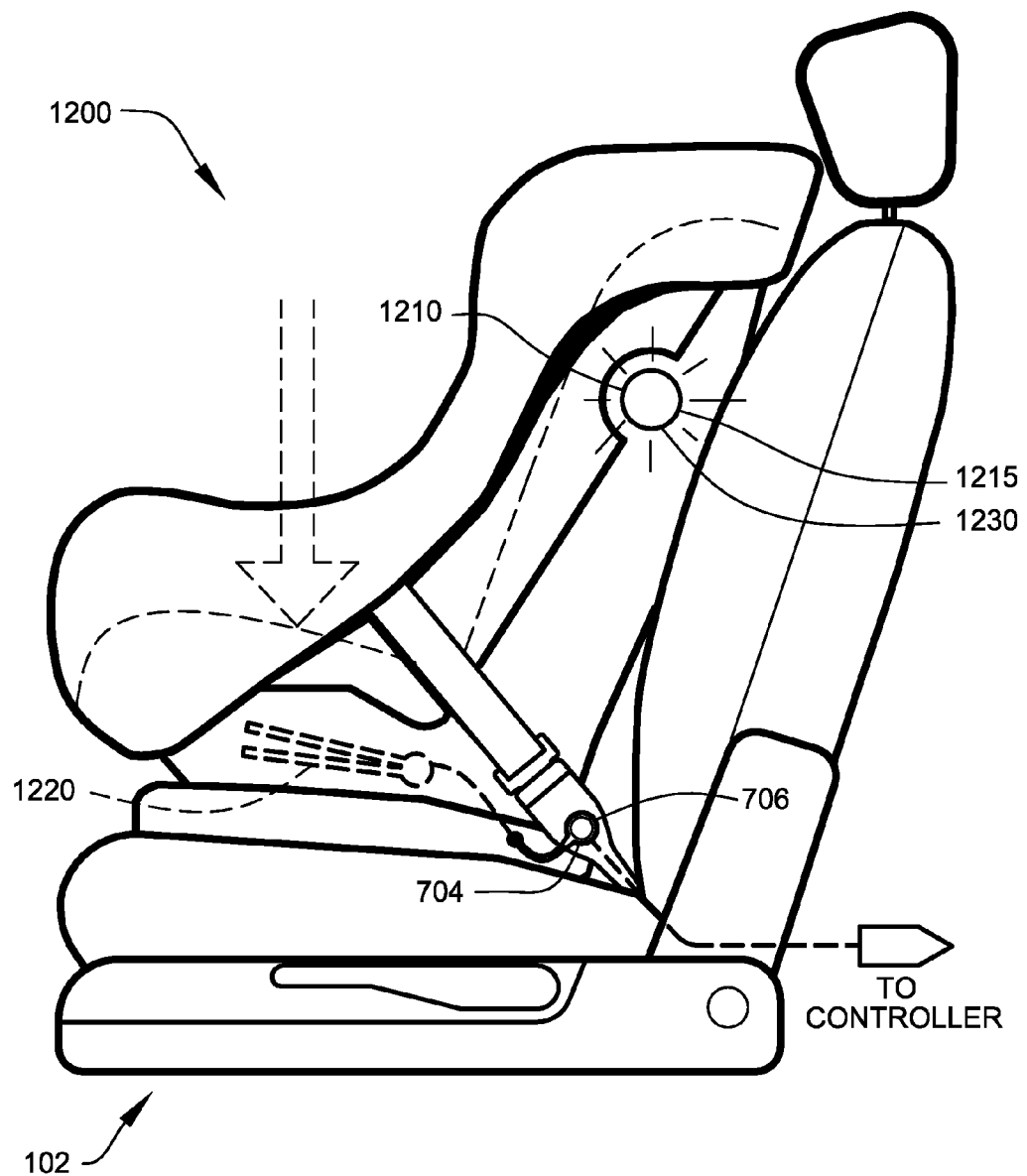
FIG. 16 shows a side view, of an intelligent child seat, for use within a vehicle having a driver reminder system, according to another preferred embodiment of the present invention.

FIG. 16 shows a side view, of another intelligent child seat 1200, for use within a vehicle 102 having a driver reminder system, according to another preferred embodiment of the present invention. It is noted that intelligent seat 1200 comprises physical arrangements substantially similar to intelligent child seat 700 the preferred embodiment of FIG. 10; thus, only the differences between FIG. 10 and the prior embodiment will be elaborated upon.

Intelligent seat 1200 preferably operates and is preferably utilized in a manner similar to intelligent child seat 700, however, onboard occupant sensor 702 of intelligent seat 1200 preferably comprises at least one mechanical occupant sensor 1220 and at least one "seat occupied" light 1210, as shown. Intelligent seat 1200 is preferably used within a vehicle equipped with driver reminder system, and or enhanced-reminder subsystem 600, according to preferred embodiments of the present invention.

Intelligent seat 1200 preferably comprises a fully functional child or infant car seat designed to carry an infant or toddler securely in vehicle 102. Intelligent seat 1200 is preferably configured to hold the child in a comfortable manner so that the child does not move about the car while it is being driven and restrains and prevents injury to the child in the event of an accident. Intelligent seat 1200 comprises an output signal coupler 704 that preferably functions to operably couple the seat to driver reminder system (DRS) 100, preferably via input signal coupler 706 of the vehicle.

The distinguishing feature of intelligent seat 1200 is the preferred incorporation of a specific type of onboard occupant sensor 1220 within the seat to identify the presence of an infant or child within the vehicle cabin and means for connecting the seat sensor to driver reminder system (DRS) 100, and or enhanced-reminder subsystem 600. Occupant sensor 1220 preferably comprises at least one, preferably only one electronic mechanical switch sensor, preferably a safety hinge switch as available from http://www.leuze.com preferably model number S410-M1CB2-B (cabled), alternately preferably model S410-M1M12-B (uncabled). The above-described arrangement at least embodying herein at least one child-present sensor comprises at least one mechanical switch sensor structured and arranged to activate upon weight-bearing pressure of the at least one child. Upon reading this specification, those with ordinary skill in the art will now appreciate that, under appropriate circumstances, considering such issues as design preference, user preferences, marketing preferences, cost, structural requirements, available materials, technological advances, etc., other electronic mechanical switch sensor arrangements, such as, for example, wireless notifiers, other mechanical movements, etc., may suffice.

Intelligent seat 1200 preferably comprises at least one "seat occupied" light 1210, preferably comprising at least one light emitting diode (LED) 1215, as shown. When a child is placed into intelligent seat 1200, at least one "seat occupied" light 1210 preferably is illuminated to preferably verify that a child is present and the occupant sensor 1220 has been activated (at least embodying herein at least one "seat occupied" light structured and arranged to indicate that said at least one vehicle ignition sensor is activated).

Illumination of "seat occupied" light 1210 also preferably indicates that intelligent seat 1200 has been connected to driver reminder system 100.

Preferably, "seat occupied" light 1210 is activated by activation of onboard occupant sensor 702 whether pressure activated, mechanical activated or other activated. Alternately preferably, "seat occupied" light 1210 is activated by seatbelt-connection. Upon reading this specification, those with ordinary skill in the art will now appreciate that, under appropriate circumstances, considering such issues as design preference, user preferences, marketing preferences, cost, structural requirements, available materials, technological advances, etc., other light activation arrangements such as, for example, manual activation, movement activation, weight activation, etc., may suffice.

Alternately preferably, "seat occupied" light 1210 is activated by control unit 720 when such control unit 720 shows the occupant present and the driver reminder system 100 activated (as additionally discussed herein).

Preferably, "seat occupied" light 1210 is placed to be easily seen by at least the vehicle driver and assist indication that the driver reminder system 100 is operational. In a preferred embodiment, "seat occupied" light 1210 is placed along the upper back portion 1230 of intelligent seat 1200, as shown. Upon reading this specification, those with ordinary skill in the art will now appreciate that, under appropriate circumstances, considering such issues as design preference, user preferences, marketing preferences, cost, structural requirements, available materials, technological advances, etc., other "seat occupied" light placement arrangements such as, for example, above the child seat, along the base of the child seat, adjacent the child seat, etc., may suffice.

Figure 13:
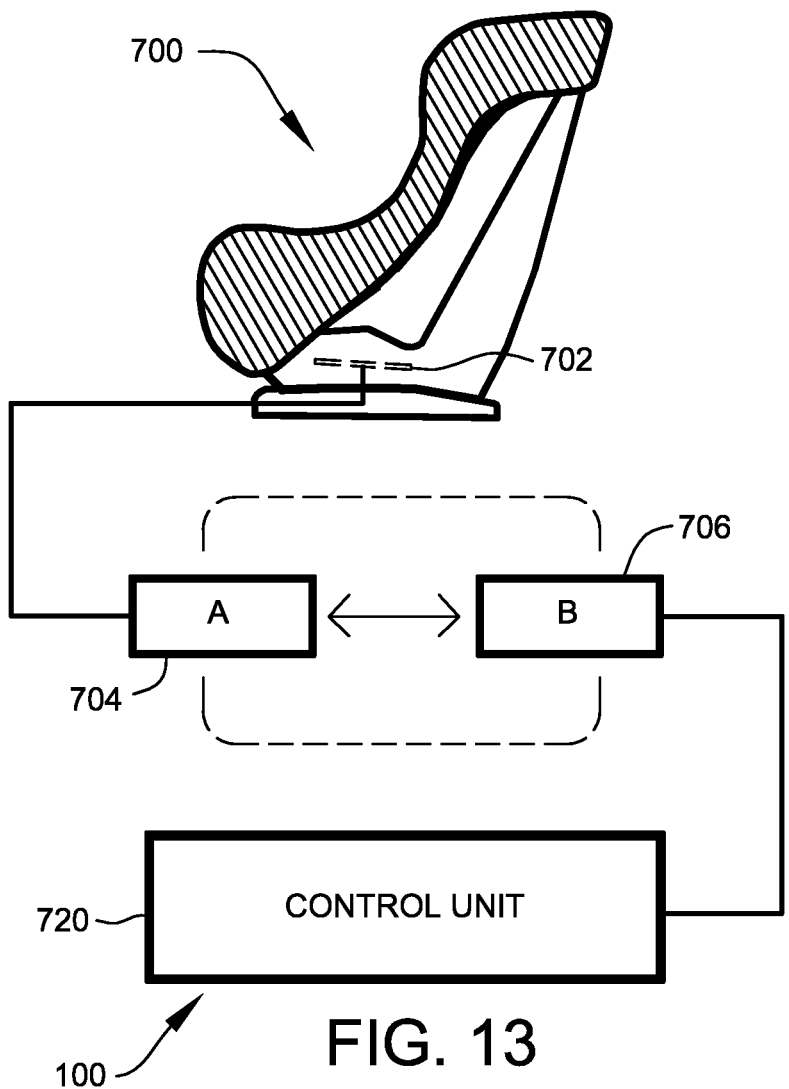
FIG. 13 shows a schematic diagram, illustrating a preferred functional organization of the intelligent child seat and vehicle of FIG. 10.

FIG. 13 shows a schematic diagram, illustrating a generalized functional organization of the preferred operational environment of intelligent seat 700. Shown in FIG. 13 are intelligent seat 700 (comprising onboard occupant sensor 702), input signal coupler 706, output signal coupler 704, and at least one control unit 720 for communicating with intelligent seat 700. In one highly preferred embodiment of the system, control unit 720 comprises DRS 100 and/or enhanced-reminder subsystem 600, as shown.

As previously described, DRS 100 is most preferably integrated within vehicle 102. Upon reading this specification, those with ordinary skill in the art will now appreciate that, under appropriate circumstances, considering such issues as cost, user preference, etc., other arrangements such as, for example, integrating the functions of a driver reminder and or enhanced-reminder system within an alternate intelligent seat allowing the driver reminder functions to be used in older existing vehicle not equipped with an integral driver reminder system, etc., may suffice. Furthermore, upon reading this specification, those with ordinary skill in the art will now appreciate that, under appropriate circumstances, considering such issues as cost, user preference, etc., other system arrangements such as, for example, utilizing an intelligent seat with a conventional type car alarm wherein the seat sensor provides an alarm signal that is interpreted by the alarm system as an alarm event (for example, triggering when the driver exits the vehicle and activates the alarm system), etc., may suffice.

As illustrated in FIG. 10 through FIG. 12, input signal coupler 706 and output signal coupler 704 most preferably comprise at least one hard-wired connection utilizing electrical signal cabling. Alternately preferably, input signal coupler 706 and output signal coupler 704 are preferably configured to transfer the sensor output signals "wirelessly", without the use of such electrical conductors.

In one alternate preferred embodiment of the system, input signal coupler 706 and output signal coupler 704 comprise an optical emitter A and optical receiver B. Such an alternate preferred arrangement may preferably comprise an infrared (IR) emitter-receiver pair, of a configuration known to those skilled in the art of optical wireless signal transmission. In one alternate preferred embodiment of the system, input signal coupler 706 and output signal coupler 704 comprise a radio-frequency emitter A and radio-frequency receiver B. Such an alternate preferred arrangement may preferably comprises, for example, a low-energy RF emitter-receiver pair, of a configuration known to those skilled in the art of low-wattage RF signal transmission. Upon reading this specification, those with ordinary skill in the art will now appreciate that, under appropriate circumstances, considering such issues as cost, user preference, etc., other signal-transmission arrangements such as, for example, GSM-based messaging to a remote monitor, GPS-enabled automatic emergency calling, etc., may suffice.

Figure 14:
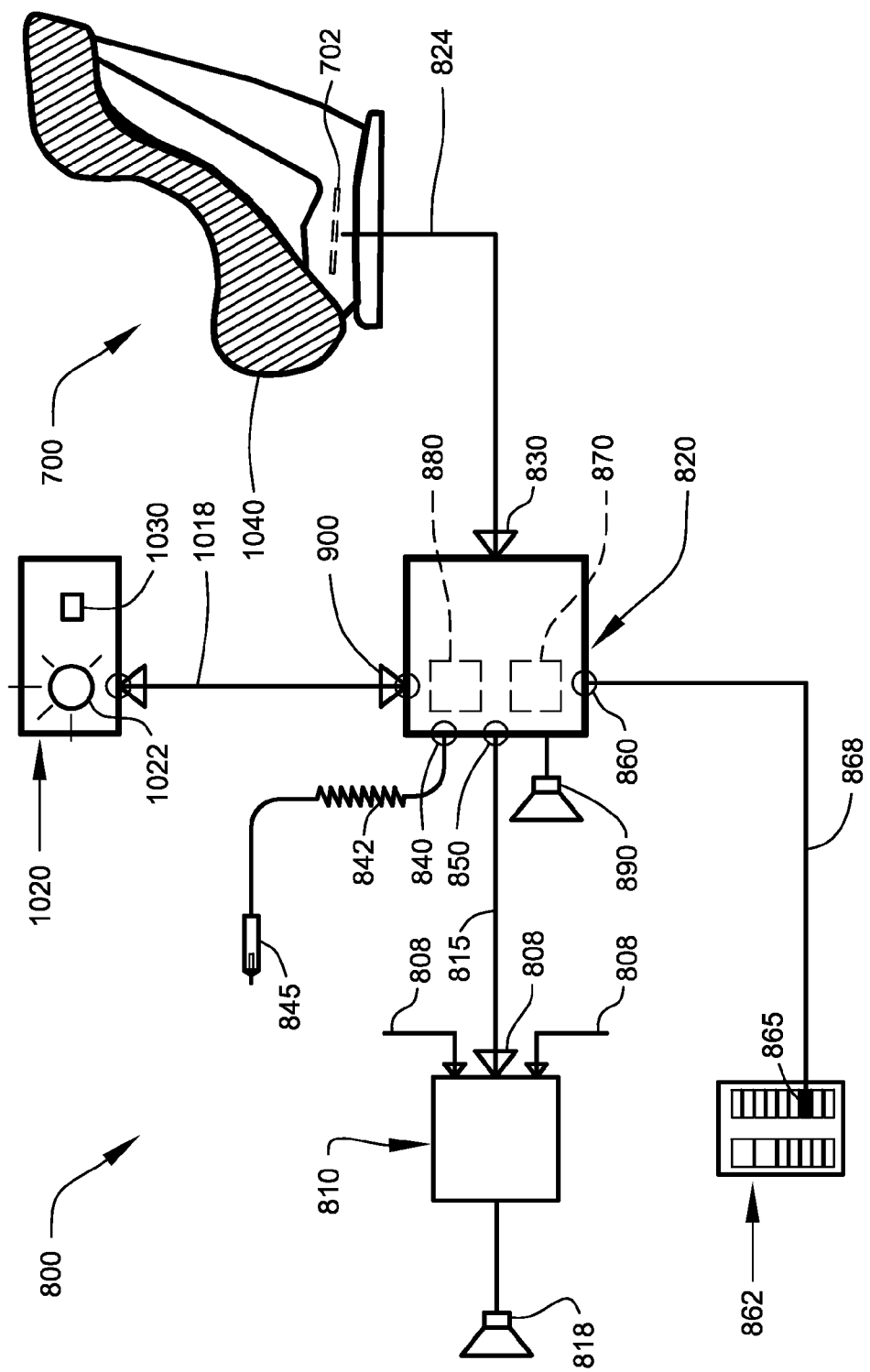
FIG. 14 shows a schematic diagram, illustrating another driver reminder device of the driver reminder systems, attachable to a vehicle alarm system, according to a preferred embodiment of the present invention.

FIG. 14 shows a schematic diagram, illustrating another driver reminder device 800 of the driver reminder systems 100, attachable to a vehicle alarm system 810, according to another preferred embodiment of the present invention.

Preferably, driver reminder device 800 comprises at least one onboard occupant sensor 702 and at least one control unit 820, as shown. Preferably, control unit 820 comprises at least one occupant sensor input 830, at least one power input 840, at least one alarm output 850, at least one vehicle power sensing input 860, at least one timer processor 870, at least one processor 880 and at least one internal alert-sounder 890, as shown. Additionally, control box preferably comprises at least one indicator panel output 900, as shown. Upon reading this specification, those with ordinary skill in the art will now appreciate that, under appropriate circumstances, considering such issues as design preference, user preferences, marketing preferences, cost, structural requirements, available materials, technological advances, etc., other device arrangements such as, for example, HUD displays, phone dialers, optional sensors, accelerometers, GPS, auto-dialers, cameras, etc., may suffice.

Onboard occupant sensor 702 (at least embodying herein child-present sensor means for sensing the presence of a child in the motor vehicle; and, at least embodying herein at least one child-present sensor structured and arranged to sense the presence of at least one child in the motor vehicle) of driver reminder device 800 preferably comprises at least one seat occupancy sensor and at least one sending conduit 824 (alternately preferably an optionally two seat occupancy sensors), preferably of a type using at least one pressure detection technology, preferably at least one force sensor structured and arranged to generate "occupant-present" signal 603 (similar for example, to FIG. 8) when a downward force 714 is applied on surface 716 of for example, an intelligent seat 700 (see also FIG. 10) as described herein (which may also be associated with the presence of a secondary vehicle occupant 103 in the seat). Upon reading this specification, those with ordinary skill in the art will now appreciate that, under appropriate circumstances, considering such issues as design preference, user preferences, marketing preferences, cost, structural requirements, available materials, technological advances, etc., other sending conduit arrangements such as, for example, wireless, infrared, etc., may suffice.

Control unit 820 preferably is powered by power input 840 preferably being a 12-volt DC power cord 842, preferably comprising at least one male end 845 insertable into a standard female "power-on" vehicle plug-in, preferably such female "power-on" vehicle plug-in having constant (direct to battery) 12-volt power regardless of whether the vehicle ignition is on or off. Upon reading this specification, those with ordinary skill in the art will now appreciate that, under appropriate circumstances, considering such issues as design preference, user preferences, marketing preferences, cost, structural requirements, available materials, technological advances, etc., other power arrangements such as, for example, internal device battery power, other voltage power; solar power, etc., may suffice.

Control unit 820 preferably receives ignition system on/off input from a direct-wire link 868 to the ignition circuit 865 in the fuse box 862. Alternately preferably, control unit 820 may be coupled with a vehicle alarm system 810 enabled to output/ send a notification of the "ignition off" state to control unit 820. The above arrangement at least embodies herein vehicle ignition sensor means for sensing activation or deactivation of the motor vehicle ignition system; and, at least embodies herein at least one vehicle ignition sensor structured and arranged to sense activation or deactivation of the motor vehicle ignition.

Control unit 820 preferably sends alarm signaling to any of a variety of add-on vehicle alarms, preferably at least one aftermarket motor vehicle alarm that is installable into at least one motor vehicle, by connection to at least one vehicle alarm sensor input 808, preferably connecting through at least one wire harness 815, as shown. Upon reading this specification, those with ordinary skill in the art will now appreciate that, under appropriate circumstances, considering such issues as design preference, user preferences, marketing preferences, cost, structural requirements, available materials, technological advances, etc., other alarm sensor input arrangements such as, for example, wireless connection, connection through vehicle processors, etc., may suffice.

Control unit 820 preferably comprises at least one timer processor 870 which preferably operates when control unit 820 is alerted the ignition has been turned to the off position (ignition circuit 865 is off). Upon such notification, timer processor 870 preferably begins a timing sequence, preferably eight minutes in duration after which an alert signal is sent to at least one alert device. This timing sequence preferably continues for a period of from about 90 minutes to about 120 minutes in a pulsed pattern of about every 8 minutes sending an alert signal until such time when the vehicle ignition is turned on, the child occupant is removed from the child seat, the silence/cancel button is pushed, or alternately, the constant power is removed essentially shutting down control unit 820.

Control unit 820 preferably further comprises at least one processor 880, preferably pre-programmed to process input(s) from the occupancy seats. Processor 880 is preferably a custom microcontroller as manufactured by the Delaine Group LLC. Of Atlanta Ga. (See Appendix A). Processor 880 preferably is couplable directly to a vehicle alarm through the use of at least one wire harness 815, preferably comprising a set of standardized portals to connectable to "pigtail" of vehicle alarm system 810 and co-operate with the vehicle alarm processor(s). Upon reading this specification, those with ordinary skill in the art will now appreciate that, under appropriate circumstances, considering such issues as design preference, user preferences, marketing preferences, cost, structural requirements, available materials, technological advances, etc., other wiring harness arrangements such as, for example, custom connections, wireless connections, inclusive vehicle alarms within system components, etc., may suffice.

Alternately preferably, control unit 820 is programmable by at least one user and/or alarm installer. Upon reading this specification, those with ordinary skill in the art will now appreciate that, under appropriate circumstances, considering such issues as design preference, user preferences, marketing preferences, cost, structural requirements, available materials, technological advances, etc., other processor program arrangements such as, for example, wireless programming, computer-link programming, satellite link programming, etc., may suffice.

In use, control unit 820 preferably receives seat occupancy input from onboard occupant sensor 702, as shown. If no signal is received from onboard occupant sensor, no warnings or timer are initiated. If an "occupant-present" signal 603 is received by processor 880, processor 880 (at least embodying herein alarm processor means for receiving signals from such child-present sensor means, such vehicle electrical sensor means, and sending at least one signal to such vehicle-alert means; and, at least embodying herein at least one alarm processor structured and arranged to receive signals from such at least one child-present sensor, receive signals from such at least one motor vehicle ignition sensor, and send at least one alert signal to such at least one motor vehicle-alert) determines if the car ignition is turned to an on or off position; if the car power is on, no initiation of the alert system occurs. If the car ignition is off, processor 880 preferably initiates timer processor 870 (at least embodying herein at least one first timer structured and arranged to provide an initial timed alert immediately upon at least one child-present sensor sensing the presence of a child in the motor vehicle and such at least one vehicle ignition sensor sensing deactivation of the motor vehicle ignition) preferably comprising at least one first timer and at least one second timer. Timer processor 870 preferably activates the first timer immediately preferably for an initial timed alert of from about five seconds to about thirty seconds, preferably for eleven seconds, preferably sounding internal alert-sounder 890 for preferably eleven seconds and then ceasing. Preferably, internal alert-sounder 890 is an alternate embodiment of at least one auditory warning device 116, preferably comprising at least one audio chime unit 118, as noted above (see FIG. 2A). Upon reading this specification, those with ordinary skill in the art will now appreciate that, under appropriate circumstances, considering such issues as design preference, user preferences, marketing preferences, cost, structural requirements, available materials, technological advances, etc., other timer arrangements such as, for example, more or less timer processors, shorter or longer timer timing, other interval timers, other interval alerts, etc., may suffice.

Timer processor 870 (at least embodying herein timer means for providing at least one delayed timer alert; and, at least embodying herein at least one second timer structured and arranged to provide at least one second timed alert after a pre-determined time wherein such at least one child-present sensor continues to sense the presence of a child in the motor vehicle and such at least one vehicle ignition sensor continues to sense deactivation of the motor vehicle ignition) preferably activates second timer for a preferably time of between about five minutes and about ten minutes, preferably eight-minutes countdown duration after the car's ignition power is determined to be off. Subsequent to completion of the eight minute duration, an alarm signal is preferably generated by control unit 820, preferably being sent (being capable of sending) to at least one vehicle alarm system 810, preferably at least one installed after-market motor vehicle alarm system, preferably through at least one wire harness 815 and preferably at least initiating horn 818 (at least embodying herein vehicle-alert means for alerting at least one vehicle area adjacent the child occupant) to sound, as shown. Upon reading this specification, those with ordinary skill in the art will now appreciate that, under appropriate circumstances, considering such issues as design preference, user preferences, marketing preferences, cost, structural requirements, available materials, technological advances, etc., other timer arrangements such as, for example, more or less timer processors, shorter or longer timer timing, other interval timers, other interval alerts, etc., may suffice. Further, Upon reading this specification, those with ordinary skill in the art will now appreciate that, under appropriate circumstances, considering such issues as design preference, user preferences, marketing preferences, cost, structural requirements, available materials, technological advances, etc., other vehicle alarm arrangements such as, for example, OEM alarms, dealer installed alarms, etc., may suffice.

Preferably, driver reminder device 800 preferably comprises at least one indicator panel 1020 preferably comprising at least one indicator light 1022 and at least one silencer switch 1030, as shown. Preferably, indicator panel 1020 receives indicator panel output 900 from control unit 820 through at least one signal conduit 1018 to reflect at least an operational signal when the car seat is occupied and the ignition is turned off. Signal conduit 1018 preferably further provides a communication feedback from indicator panel 1020 to control unit 820.

Preferably, indicator light 1022 turns on when the onboard occupant sensor 702 indicates an occupant in at least one car seat 1040 and ignition circuit 865 is off, as shown. Indicator light 1022 preferably acts as an additional driver reminder that an occupant is present in car seat 1040, as shown. As described above, indicator panel 1020 may be considered an alternate embodiment of dashboard warning components 107 which are preferably adapted to communicate at least one perceptible alert indicating to vehicle operator 101 the presence of one or more secondary occupants 103. The preferred locating of such alert apparatus within the dashboard region 108 of the vehicle cabin maximizes the potential for observation and acknowledgement by vehicle operator 101. Dashboard warning components 107 preferably comprise at least one visual warning 112, preferably comprising at least one light 114 (see at least FIG. 2A).

Silencer switch 1030 (at least embodying herein at least one override releaser structured and arranged to override such at least one alert generator) preferably provides an alternative off switch to silence either the internal alert-sounder 890 (for example, prior to removal of an infant sleeping), or the (external) horn 818 should an occupant remain present beyond the timer duration (eight minutes, for example). Upon reading this specification, those with ordinary skill in the art will now appreciate that, under appropriate circumstances, considering such issues as design preference, user preferences, marketing preferences, cost, structural requirements, available materials, technological advances, etc., other indicator panel arrangements such as, for example, head's up display's, wireless communicators, additional timers, other forms of driver alerts, etc., may suffice.

Figure 15:
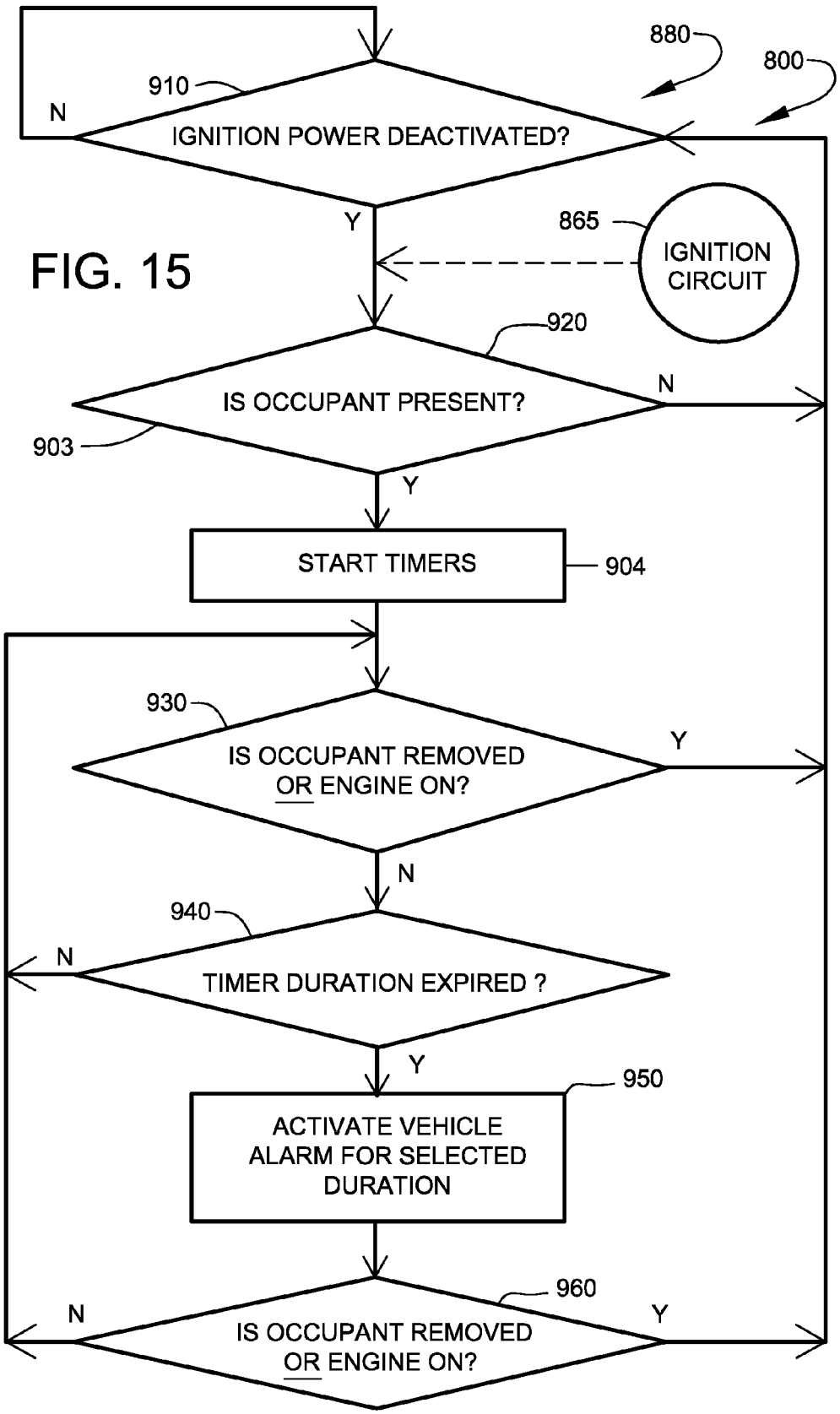
FIG. 15 shows a logic diagram of processor 1000, according to a preferred embodiment of the present invention.

FIG. 15 shows a logic diagram of control unit 820, according to a preferred embodiment of the present invention. Operation of control unit 820 is preferably initiated upon powering the control unit 820, as shown. In determination step 910 processor 880 determines the status of ignition circuit 865. If ignition circuit 865 is off, processor 880 then progresses to determination step 920 wherein the system determines the status of "occupant-present" signal 903. If "occupant-present" signal 903 indicates that no passenger occupant is present in car seat 1040, processor 880 preferably returns to step 910. If "occupant-present" signal 903 indicates the presence of the passenger occupant in car seat 1040, timer processor 870 preferably activates a first timer element preferably immediately for 11 seconds interval countdown in timer step 904. At the same time as initiating a first timer element, timer processor 870 preferably activates a second timer element process preferably for an 8 minute interval countdown also in timer step 904, as shown.

Next, the system progresses to determination step 930 wherein the system determines if the "occupant-present" signal 903 continues to indicate the presence of the passenger occupant and ignition circuit 865 is off. If either of the two signal conditions change, that is, the system determines that either the "occupant-present" signal 903 suggests a removal of the passenger occupant from car seat 1040 or ignition circuit 865 indicates that the operation of vehicle ignition has restarted, the system resets and returns to step 910. If both of the two signal conditions remain the same, the system proceeds to check the status of the countdown in step 940. In step 940, processor 880 determines if the duration of the countdown has been exhausted. If the timed interval has not been exhausted, the system preferably loops back to determination step 930 and rechecks signal status. The system preferably loops until determining that the timed interval has ended and the countdown is complete. On completion of the countdown, the system proceeds to step 950 and vehicle horn 818 is activated, as shown. From step 950, the system advances to determination step 960. In determination step 960, the system again determines if the "occupant-present" signal 903 continues to indicate the presence of the passenger occupant and continues to signal that the ignition circuit 865 is off. If either of the two signal conditions is found to have changed, that is, the system determines that either the "occupant-present" signal 903 suggests a removal of the passenger occupant from vehicle and/or the ignition circuit 865 indicates that the operation of vehicle 102 has restarted, the system resets and returns to step 910 to await the next vehicle engine ignition circuit 865 shutdown signal. If both of the two signal states remain the same, the system preferably returns to step 950 wherein vehicle alarm system 810 and at least horn 818 are again activated. In one preferred embodiment of timer processor 870, activation of vehicle alarm system 810 (at least horn 818) is preferably configured to repeat every eight minutes for up to about two hours. Upon reading this specification, those with ordinary skill in the art will now appreciate that, under appropriate circumstances, considering such issues as cost, user preference, etc., other signaling arrangements such as, for example, flashing of the vehicles headlights, etc., may suffice. Furthermore, upon reading this specification, those with ordinary skill in the art will now appreciate that, under appropriate circumstances, considering such issues as design preference, user preferences, marketing preferences, cost, structural requirements, available materials, technological advances, etc., other vehicle decision and status display arrangements such as, for example, prevention of door locking features, immediate audio/visual reminders on engine shutdown, deployment of door latching features, etc., may suffice. Furthermore, upon reading this specification, those with ordinary skill in the art will now appreciate that, under appropriate circumstances, considering such issues as design preference, user preferences, marketing preferences, cost, structural requirements, available materials, technological advances, etc., other vehicle decision and status display arrangements such as, for example, automatic shutdown and wakeup features, embedded vehicle logic systems, programmable logic, interactive status monitor screens, additional lights on instrument panel indicating status of child/infant, circuits to initiate the wireless sending of an alert message to a communication device, using a recorded or synthesized voice and dedicated speaker to provide a verbal alert, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to reminding at least one driver of a motor vehicle that there is at least one child occupant in the motor vehicle when the ignition of the motor vehicle is inactivated and a child is present in the motor vehicle, comprising:
 a) at least one child-present sensor structured and arranged to sense the presence of at least one child in the motor vehicle;
 b) at least one vehicle ignition sensor structured and arranged to sense activation or deactivation of the motor vehicle ignition;
 c) at least one motor-vehicle alert structured and arranged to alert at least one motor vehicle area adjacent the child occupant; and
 d) at least one alarm processor structured and arranged to
  i) receive signals from said at least one child-present sensor,
  ii) receive signals from said at least one motor vehicle ignition sensor, and
  iii) send at least one alert signal to said at least one motor-vehicle alert;
 e) wherein said system may alert the at least one driver of the motor vehicle that there is at least one child occupant in the motor vehicle when the ignition of the motor vehicle is inactivated and at least one child is present in the motor vehicle;
 f) at least one "seat occupied" light structured and arranged to indicate that said at least one vehicle ignition sensor is activated.

2. The system according to claim 1 further comprising at least one timer structured and arranged to provide at least one timed alert when the ignition of such motor vehicle is inactivated and a child is present in the motor vehicle.

3. The system according to claim 2 wherein said at least one timer comprises:
 a) at least one first timer structured and arranged to provide an initial timed alert immediately upon at least one child-present sensor sensing the presence of a child in the motor vehicle and said at least one vehicle ignition sensor sensing deactivation of the motor vehicle ignition; and
 b) at least one second timer structured and arranged to provide at least one second timed alert after a pre-determined time wherein said at least one child-present sensor continues to sense the presence of a child in the motor vehicle and said at least one vehicle ignition sensor continues to sense deactivation of the motor vehicle ignition.

4. The system according to claim 3 wherein said at least one first timer provides an initial timed alert of from about 5 seconds to about 30 seconds.

5. The system according to claim 4 wherein said at least one second timer provides at least one second timed alert after a pre-determined time of between about five minutes and about ten minutes.

6. The system according to claim 1 further comprising at least one aftermarket motor vehicle alarm structured and arranged to be installed into at least one motor vehicle.

7. The system according to claim 6 wherein said at least one aftermarket motor-vehicle alarm is structured and arranged to

31 receive such at least one alert signal from said at least one alarm processor when installed in the at least one motor vehicle.

8. The system according to claim 1 wherein said at least one motor-vehicle alert comprises at least one motor-vehicle horn blast.

9. The system according to claim 1 wherein said at least one child-present sensor comprises at least one pressure-sensitive sensor structured and arranged to activate upon weight-bearing pressure of the at least one child.

10. The system according to claim 9 wherein said at least one pressure-sensitive sensor comprises at least one pad structured and arranged to be placed under the at least one child occupant.

11. The system according to claim 1 wherein said at least one child-present sensor comprises at least one mechanical switch sensor structured and arranged to activate upon weight-bearing pressure of the at least one child.

12. A system, relating to reminding at least a driver of a motor vehicle that there is at least one second occupant in the motor vehicle, comprising:
 a) at least one occupant detector structured and arranged to detect the presence of at least one second occupant within the motor vehicle; and
 b) at least one processor structured and arranged to
  i) receive at least one signal from said at least one occupant detector; and
  ii) receive at least one engine ignition on/off signal; and
 c) at least one alert generator structured and arranged to generate at least one alert when received by said at least one processor;
 d) wherein at least the driver of a motor vehicle may be reminded of the presence of the at least one second occupant in the vehicle within a specified time;
 e) wherein said at least one alert generator further comprises at least one "seat occupied" light structured and arranged to indicate that said at least one vehicle ignition sensor is activated.

13. The system according to claim 12 wherein said at least one alert generator comprises at least one alert generating signal to at least one installed vehicle alarm.

14. The system according to claim 12 further comprising at least one override releaser structured and arranged to override said at least one alert generator.

15. The system according to claim 14 wherein:
 a) said at least one override releaser is structured and arranged to require at least one driver manual-action to operate said at least one override releaser; and
 b) such at least one driver manual-action comprises at least one purposeful manual action of the driver.

16. The system according to claim 14 wherein said at least one override releaser comprises at least one switch structured and arranged to de-activate said at least one alert generator.

17. The system according to claim 12 further comprising:
 a) at least one child safety seat structured and arranged to support the at least one second occupant within the motor vehicle;
 b) wherein said at least one child safety seat comprises at least one sensor structured and arranged to provide at least one sensor output signal when a child is present in said at least one child safety seat.

18. A system, relating to reminding at least one driver of a motor vehicle that there is at least one child occupant in the motor vehicle, comprising:
 a) at least one child-present sensor structured and arranged to sense the presence of a child in the motor vehicle;

32 b) at least one vehicle ignition-electrical state on/off processor structured and arranged to determine if vehicle electrical is on or off;
 c) wherein said at least one child-present sensor comprises at least one child sensor signaler structured and arranged to send at least one child sensor signal of child present and child not present signals;
 d) wherein said at least one vehicle ignition-electrical state on/off sensor comprises at least one electrical sensor signaler structured and arranged to signal at least one ignition-electrical state sensor signal of ignition-electrical state present and ignition-electrical state not present signals;
 e) at least one processor structured and arranged to process said at least one child sensor signal and said at least one ignition-electrical state sensor signal;
 f) wherein said at least one processor comprises at least one communicator structured and arranged to communicate with at least one vehicle installable alarm apparatus; and
 g) at least one "seat occupied" light structured and arranged to indicate that said at least one vehicle ignition-electrical state on/off sensor is activated
 h) whereby when said at least one child-present sensor senses the presence of a child in the motor vehicle and when said at least one processor determines that vehicle ignition-electrical state is in an off state, an alert signal is communicated to such at least one installed vehicle alarm apparatus to emit at least one alarm to remind at least one driver of a motor vehicle that the child is in the motor vehicle.

19. A method, relating to preventing abandonment of at least one passenger occupant in at least one child seat, within a cabin of a motor vehicle, after operation of the motor vehicle has ceased, said method comprising the steps of:
 a) providing at least one first sensor to sense the presence of the at least one passenger occupant in the at least one child seat, wherein such at least one first sensor provides at least one occupant-present signal signaling the presence of the at least one passenger occupant in the at least one child seat;
 b) accessing at least one vehicle-status signal signaling that the operation of the motor vehicle has ceased;
 c) providing at least one alert actuator to actuate at least one perceptible alert alerting at least one individual to a possible abandonment of the at least one passenger occupant in the at least one child seat of the motor vehicle; and
 d) providing within such at least one alert actuator at least one interval timer structured and arranged to time at least one selected time interval having an interval start and an interval end;
 e) wherein such at least one alert actuator is structured and arranged to
  i) initiate the interval start of the at least one selected time interval when such at least one occupant-present signal signals the presence of the at least one passenger occupant in the at least one child seat and such at least one vehicle-status signal signals that the operation of the motor vehicle has ceased, and
  ii) initiate the actuation of the at least one perceptible alert if, on reaching the interval end, such at least one occupant-present signal continues to signal the presence of the at least one passenger occupant within such at least one child seat and such at least one vehicle-status signal continues to signal that the operation of the motor vehicle remains ceased;

f) providing at least one "seat occupied" light structured and arranged to indicate that said at least one vehicle-status signal is activated.

20. The method according to claim 19 further comprising the steps of:
   a) providing at least one portable child safety seat to support the at least one passenger occupant within the cabin of the motor vehicle; and
   b) integrating such at least one first sensor within such at least one portable child safety seat.

21. The method according to claim 19 further comprising the steps of:
   a) providing at least one first timer to provide an initial timed alert of from about 5 seconds to about 30 seconds; and
   b) providing at least one second timer to provide at least one second timed alert after a pre-determined time of between about 5 minutes and about 10 minutes.

22. The method according to claim 19 further comprising the step of connecting such actuation of the at least one perceptible alert to at least one vehicle alarm system.

23. A system, relating to reminding at least one driver of a motor vehicle that there is at least one child occupant in the motor vehicle, comprising:
   a) child-present sensor means for sensing the presence of a child in the motor vehicle;
   b) vehicle ignition sensor means for sensing activation or deactivation of the motor vehicle ignition system;
   c) vehicle-alert means for alerting at least one vehicle area adjacent the child occupant; and
   d) alarm processor means for receiving signals from said child-present sensor means, said vehicle electrical sensor means, and sending at least one signal to said vehicle-alert means;
   e) wherein said system may alert the at least one driver of a motor vehicle that there is at least one child occupant in the motor vehicle;
   f) "seat occupied" light means for indicating that said at least one vehicle ignition sensor is activated.

24. The system according to claim 23 further comprising timer means for providing at least one delayed timer alert.

* * * * *